US012572590B2

(12) United States Patent
McElwain et al.

(10) Patent No.: US 12,572,590 B2
(45) Date of Patent: Mar. 10, 2026

(54) APPARATUSES, COMPUTER-IMPLEMENTED METHODS, AND COMPUTER PROGRAM PRODUCTS FOR IMPROVED CONTROLLED OUTPUT OF AUDIO DATA

(71) Applicant: Honeywell International Inc., Charlotte, NC (US)

(72) Inventors: John Raymond McElwain, Fort Worth, TX (US); John William Doud, Jr., Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 246 days.

(21) Appl. No.: 18/469,124

(22) Filed: Sep. 18, 2023

(65) Prior Publication Data

US 2025/0013690 A1     Jan. 9, 2025

Related U.S. Application Data

(60) Provisional application No. 63/512,661, filed on Jul. 9, 2023.

(51) Int. Cl.
　*G06F 16/638*　　(2019.01)
　*G06F 3/04847*　　(2022.01)
　*G06F 21/31*　　(2013.01)

(52) U.S. Cl.
　CPC ........ G06F 16/639 (2019.01); G06F 3/04847 (2013.01); G06F 21/31 (2013.01)

(58) Field of Classification Search
　CPC ..... G06F 16/639; G06F 3/04847; G06F 21/31
　See application file for complete search history.

(56) References Cited

U.S. PATENT DOCUMENTS

| | | | |
|---|---|---|---|
| 8,135,773 B2 | 3/2012 | Stopniewicz et al. | |
| 9,998,203 B2 | 6/2018 | Di Costanzo et al. | |
| 2004/0139467 A1 | 7/2004 | Rogerson et al. | |
| 2013/0055321 A1* | 2/2013 | Cline ............... | H04N 21/41422 |
| | | | 725/77 |

(Continued)

FOREIGN PATENT DOCUMENTS

| | | |
|---|---|---|
| WO | 2020/193573 A1 | 10/2020 |
| WO | 2020/236672 A1 | 11/2020 |

OTHER PUBLICATIONS

Extended European Search Report Mailed on Nov. 20, 2024 for EP Application No. 24181918, 9 page(s).

*Primary Examiner* — Fan S Tsang
(74) *Attorney, Agent, or Firm* — Alston & Bird LLP

(57)　　　　ABSTRACT

Embodiments of the present disclosure provide for improved secure audio outputting onboard a vehicle. Some embodiments utilize an authorized control device that facilitates authenticated control of creation or other altering of a set of playable audio data. The playable audio data, or updates thereto, are pushable via at least one wireless communications network to at least one intermediary device, and forwarded to an onboard vehicle system onboard a particular vehicle. The onboard vehicle system subsequently may be controlled, for example locally via wired communication system, to perform output of audio via one or more audio outputs onboard the vehicle, in some embodiments without adjustable control of the set of playable audio data.

20 Claims, 16 Drawing Sheets

(56)          References Cited

U.S. PATENT DOCUMENTS

| | | | |
|---|---|---|---|
| 2015/0288739 A1* | 10/2015 | Healy | H04N 21/2146 |
| | | | 715/738 |
| 2018/0124154 A1* | 5/2018 | Watson | H04M 1/6091 |
| 2018/0343051 A1 | 11/2018 | Bramoulle et al. | |
| 2020/0097169 A1* | 3/2020 | Diaz | G06F 3/04817 |

* cited by examiner

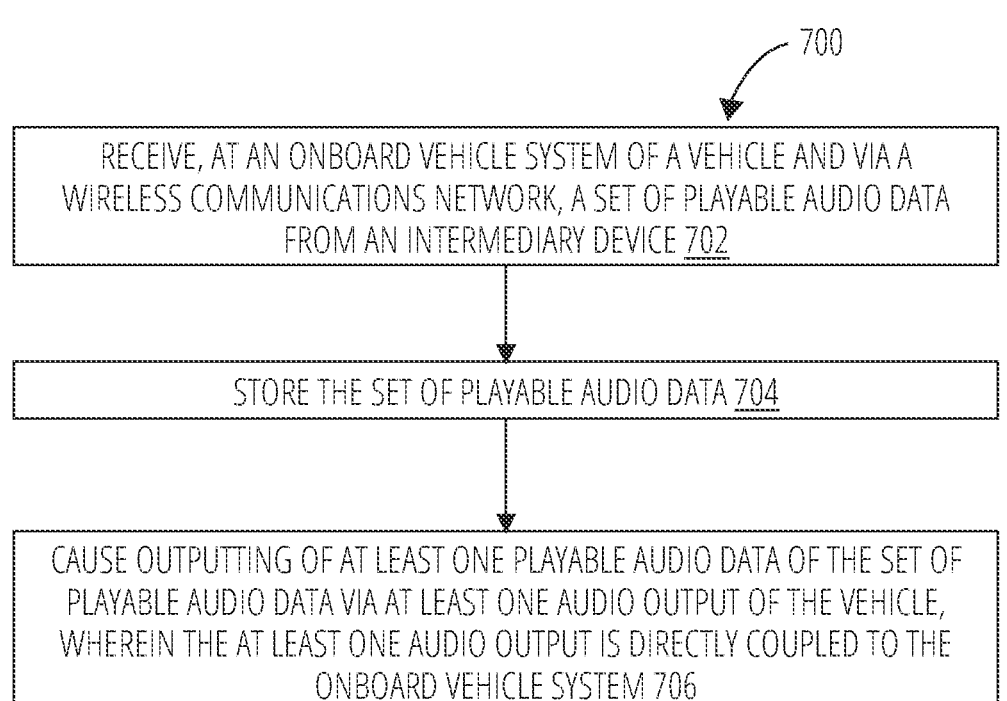

700

RECEIVE, AT AN ONBOARD VEHICLE SYSTEM OF A VEHICLE AND VIA A WIRELESS COMMUNICATIONS NETWORK, A SET OF PLAYABLE AUDIO DATA FROM AN INTERMEDIARY DEVICE 702

STORE THE SET OF PLAYABLE AUDIO DATA 704

CAUSE OUTPUTTING OF AT LEAST ONE PLAYABLE AUDIO DATA OF THE SET OF PLAYABLE AUDIO DATA VIA AT LEAST ONE AUDIO OUTPUT OF THE VEHICLE, WHEREIN THE AT LEAST ONE AUDIO OUTPUT IS DIRECTLY COUPLED TO THE ONBOARD VEHICLE SYSTEM 706

RECEIVE, FROM AN AUTHORIZED CONTROL DEVICE, A SET OF PLAYABLE AUDIO DATA CONTROLLED BY THE AUTHORIZED CONTROL DEVICE <u>802</u>

TRANSMIT THE SET OF PLAYABLE AUDIO DATA TO AT LEAST ONE ONBOARD VEHICLE SYSTEM VIA AT LEAST ONE WIRELESS COMMUNICATIONS NETWORK <u>804</u>

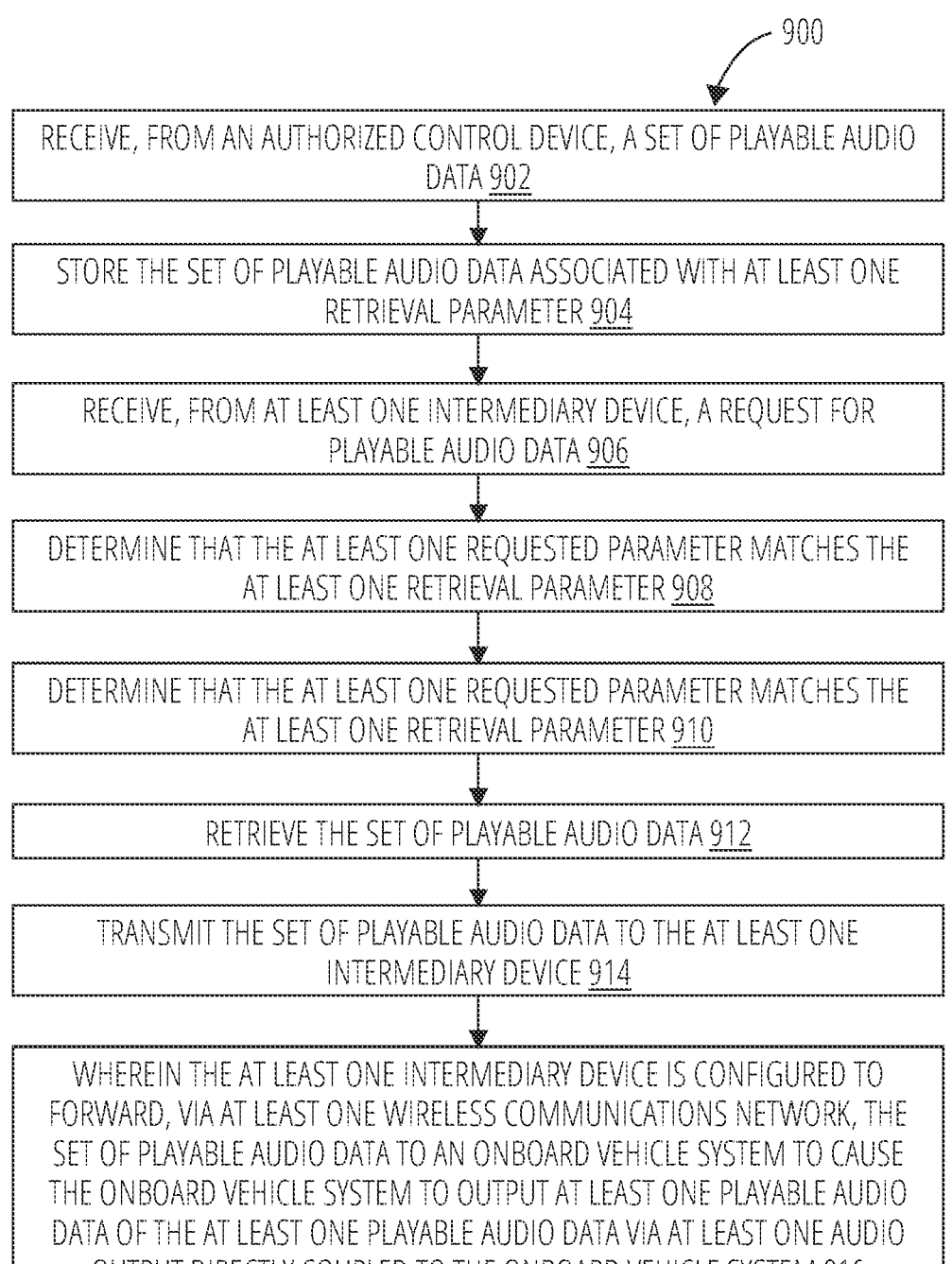

RECEIVE, FROM AN AUTHORIZED CONTROL DEVICE, A SET OF PLAYABLE AUDIO DATA 902

STORE THE SET OF PLAYABLE AUDIO DATA ASSOCIATED WITH AT LEAST ONE RETRIEVAL PARAMETER 904

RECEIVE, FROM AT LEAST ONE INTERMEDIARY DEVICE, A REQUEST FOR PLAYABLE AUDIO DATA 906

DETERMINE THAT THE AT LEAST ONE REQUESTED PARAMETER MATCHES THE AT LEAST ONE RETRIEVAL PARAMETER 908

DETERMINE THAT THE AT LEAST ONE REQUESTED PARAMETER MATCHES THE AT LEAST ONE RETRIEVAL PARAMETER 910

RETRIEVE THE SET OF PLAYABLE AUDIO DATA 912

TRANSMIT THE SET OF PLAYABLE AUDIO DATA TO THE AT LEAST ONE INTERMEDIARY DEVICE 914

WHEREIN THE AT LEAST ONE INTERMEDIARY DEVICE IS CONFIGURED TO FORWARD, VIA AT LEAST ONE WIRELESS COMMUNICATIONS NETWORK, THE SET OF PLAYABLE AUDIO DATA TO AN ONBOARD VEHICLE SYSTEM TO CAUSE THE ONBOARD VEHICLE SYSTEM TO OUTPUT AT LEAST ONE PLAYABLE AUDIO DATA OF THE AT LEAST ONE PLAYABLE AUDIO DATA VIA AT LEAST ONE AUDIO OUTPUT DIRECTLY COUPLED TO THE ONBOARD VEHICLE SYSTEM 916

FIG. 9

Media Library

1100

1102

| CATEGORY | | | | | | | |
|---|---|---|---|---|---|---|---|
| TITLE | ARTIST | DURATION | SIZE | BITRATE | DATE ADDED ↓ | ACTIONS |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |
| AUDIO NAME | AUDIO ARTIST | 3:24 | 2 MB | 3 | 17 Jul, 2023 | · · · |

Add tracks

1104 — CATEGORY A - 56
1106 — CATEGORY B - 32
1108 — CATEGORY C - 8

FIG. 11

1200
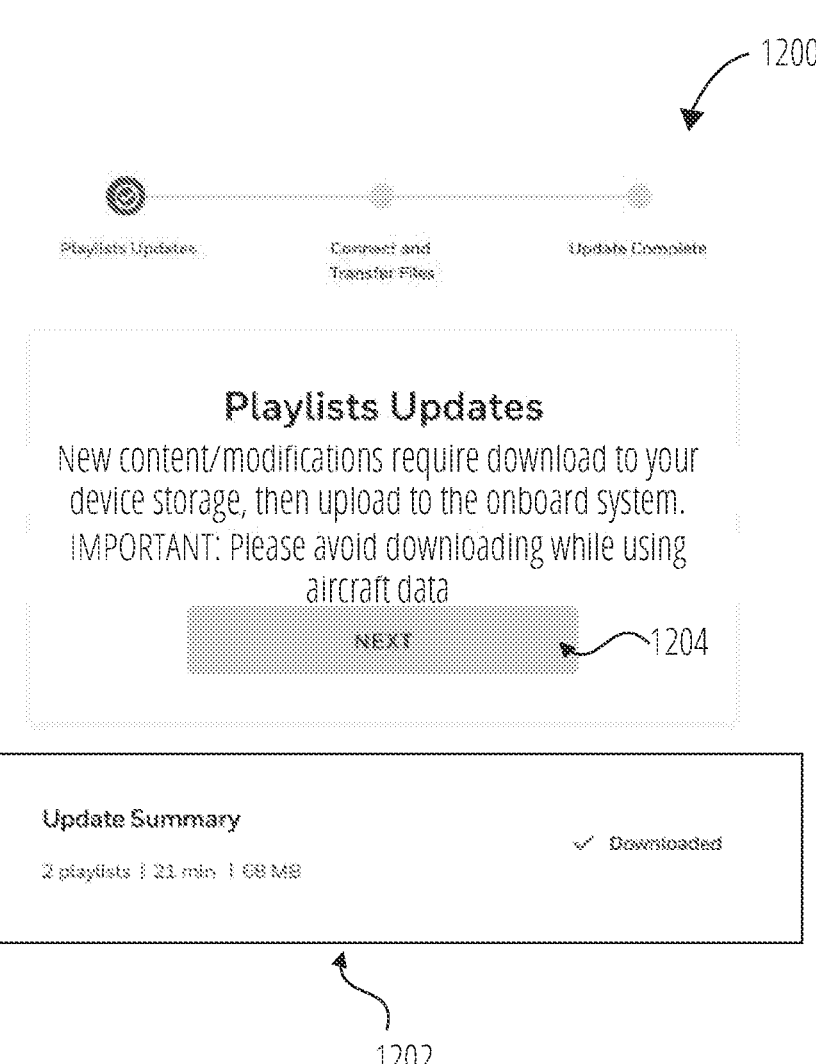
Playlists Updates
New content/modifications require download to your
device storage, then upload to the onboard system.
IMPORTANT: Please avoid downloading while using
aircraft data
NEXT    1204
Update Summary    ✓ Downloaded
2 playlists | 21 min | 68 MB
1202
FIG. 12

1400
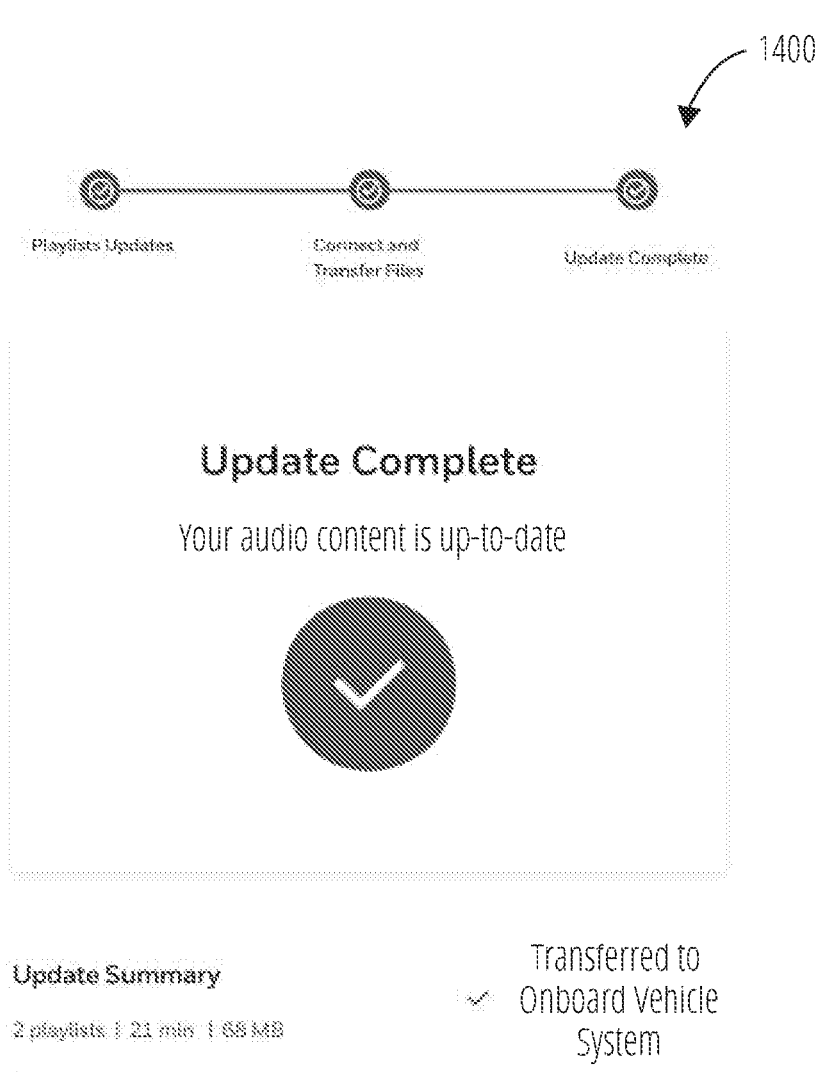
FIG. 14

APPARATUSES, COMPUTER-IMPLEMENTED METHODS, AND COMPUTER PROGRAM PRODUCTS FOR IMPROVED CONTROLLED OUTPUT OF AUDIO DATA

CROSS REFERENCE TO RELATED APPLICATIONS

This application claims priority to Provisional Application No. 63/512,661, filed Jul. 9, 2023, the content of which is incorporated herein by reference in its entirety

TECHNICAL FIELD

Embodiments of the present disclosure are generally directed to improved controlled output of audio data, and specifically to managing updating and outputting of audio data in a controlled manner for audio output onboard a vehicle.

BACKGROUND

In several contexts, audio is to be played within a vehicle. The audio to be played may be particular, defined audio sequences and/or files that provide particular information, music, and/or the like. One such context is in operation of a commercial aerial vehicle, through which announcements, music, and/or other audio data may be played throughout the course of a flight. Often, a particular entity requires secure control of what audio is outputted to the vehicle, and may desire to update the audio to keep the audio data fresh and/or relevant.

Applicant has discovered problems and/or other inefficiencies with current implementations of processing data associated with different temporal scales. Through applied effort, ingenuity, and innovation, Applicant has solved many of these identified problems by developing solutions embodied in the present disclosure, which are described in detail below.

BRIEF SUMMARY

In one aspect, a system includes an authorized control device. The system also includes at least one intermediary device. The system also includes an onboard vehicle system that is onboard a vehicle, where the authorized control device includes at least one first processor and at least one first memory that, in execution with the at least one first processor, causes the authorized control device to store a set of playable audio data. The system also includes where the authorized control device includes at least one first processor and at least one first memory that, in execution with the at least one first processor, causes the authorized control device to retrieve the set of playable audio data. The system also includes where the authorized control device includes at least one first processor and at least one first memory that, in execution with the at least one first processor, causes the authorized control device to transmit, via at least one first wireless communications network, the set of playable audio data to the at least one intermediary device, where the at least one intermediary device includes at least one second processor and at least one second memory that, in execution with the at least one second processor, causes the intermediary device to receive, from the authorized control device, the set of playable audio data controlled by the authorized control device, where the set of playable audio data is received based at least in part on at least one retrieval parameter, where the set of playable audio data is unalterable by the intermediary device. The system also includes where the authorized control device includes at least one first processor and at least one first memory that, in execution with the at least one first processor, causes the authorized control device to where the at least one intermediary device includes at least one second processor and at least one second memory that, in execution with the at least one second processor, causes the intermediary device to transmit, via at least one second wireless communications network, the set of playable audio data to the at least one onboard vehicle system, where the onboard vehicle system includes at least one third processor and at least one third processor that, in execution with the at least one third processor, causes the onboard vehicle system to receive, via the second wireless communications network, the set of playable audio data, where the set of playable audio data is unalterable by the onboard vehicle system, store the set of playable audio data, and cause outputting of at least one playable audio data of the set of playable audio data via at least one audio output of the vehicle, where the at least one audio output is directly coupled to the onboard vehicle system.

The system may also include where the authorized control device is further configured to cause rendering of a user interface that receives user input, and receive the set of playable audio data in response to the user input.

The system may also include where the authorized control device is further configured to receive at least one retrieval parameter associated with the set of playable audio data, where the set of playable audio data is stored associated with the at least one retrieval parameter, and receive a request includes at least one requested parameter, where the set of playable audio data is retrieved in response to a determination that the at least one requested parameter matches the at least one retrieval parameter associated with the set of playable audio data.

The system may also include where the authorized control device is further configured to authenticate an administrator user device, where the administrator user device is permissioned to alter the set of playable audio data.

The system may also include the at least one intermediary device further configured to cause rendering of a user interface includes at least one indication of at least one available playable set, the at least one available playable set includes the set of playable audio data, receive user input engaging a particular indication corresponding to the set of playable audio data, and in response to the user input, transmit a request to the authorized control device, the request includes at least one requested parameter corresponding to the particular indication, the requested parameter includes the at least one retrieval parameter associated with the set of playable audio data.

The system may also include the at least one intermediary device further configured to detect a connection to the at least one onboard vehicle system, where the set of playable audio data is transmitted to the at least one onboard vehicle system in response to detection of the connection.

The system may also include where the onboard vehicle system is further configured to cause rendering of an audio selection interface, where the audio selection interface includes at least one interface element that receives user input and, in response to the user input, causes outputting of a selected playable audio data corresponding to the at least one interface element.

In one aspect, a computer-implemented method includes receiving, at an onboard vehicle system of a vehicle and via a wireless communications network, a set of playable audio data from an intermediary device, where the set of playable audio data is unalterable by the onboard vehicle system and the intermediary device, storing the set of playable audio data, and causing outputting of at least one playable audio data of the set of playable audio data via at least one audio output of the vehicle, where the at least one audio output is directly coupled to the onboard vehicle system.

In one aspect, a computer-implemented method includes receiving, from an authorized control device, a set of playable audio data controlled by the authorized control device, where the set of playable audio data is received based at least in part on at least one retrieval parameter, and transmitting the set of playable audio data to at least one onboard vehicle system via at least one wireless communications network, where the onboard vehicle system is configured to output at least one playable audio data of the set of playable audio data via at least one audio output directly coupled to the onboard vehicle system.

In some example embodiments the computer-implemented method further includes causing rendering of a user interface including at least one interface element configured to control output of a selected playable audio data via the onboard vehicle system.

In some example embodiments the computer-implemented method further includes authenticating user credentials, where the set of playable audio data is retrieved based on data corresponding to the user credentials.

In some example embodiments the computer-implemented method further includes causing rendering of a user interface including at least one indication of at least one available playable set, the at least one available playable set including the set of playable audio data, receiving user input engaging a particular indication corresponding to the set of playable audio data, and in response to the user input, transmitting a request to the authorized control device, the request including at least one requested parameter corresponding to the particular indication, the requested parameter including the at least one retrieval parameter associated with the set of playable audio data.

In some example embodiments the computer-implemented method further includes detecting a connection to the at least one onboard vehicle system, where the set of playable audio data is transmitted to the at least one onboard vehicle system in response to detection of the connection.

In some example embodiments the computer-implemented method further includes receiving a notification that an update to the set of playable audio data controlled by the authorized control device is available, where the retrieving of the set of playable audio data occurs automatically in response to the notification.

In some example embodiments the computer-implemented method further includes receiving a notification that an update to the set of playable audio data controlled by the authorized control device is available, and causing rendering of an alert via a user interface, where the alert indicates that the update to the set of playable audio data is available via the authorized control device.

In some example embodiments, the set of playable audio data includes an updated set of playable audio data corresponding to a previously-stored set of playable audio data, and the computer-implemented method further includes updating storage of the previously-stored set of playable audio data based on the updated playable audio data.

In one aspect, a computer-implemented method includes receiving, from an authorized control device, a set of playable audio data. The computer-implemented method also includes storing the set of playable audio data associated with at least one retrieval parameter. The computer-implemented method also includes receiving, from at least one intermediary device, a request for playable audio data, the request includes at least one requested parameter. The computer-implemented method also includes determining that the at least one requested parameter matches the at least one retrieval parameter. The computer-implemented method also includes in response to determining that the at least one requested parameter matches the at least one retrieval parameter retrieving the set of playable audio data, and transmitting the set of playable audio data to the at least one intermediary device, where the at least one intermediary device is configured to forward, via at least one wireless communications network, the set of playable audio data to an onboard vehicle system to cause the onboard vehicle system to output at least one playable audio data of the at least one playable audio data via at least one audio output directly coupled to the onboard vehicle system.

In another aspect, an apparatus is provided. The apparatus includes at least one processor and at least one memory, the at least one memory having computer-coded instructions stored thereon that, in execution with the at least one processor, cause the apparatus to perform the steps of any one of the example computer-implemented processes described herein.

In another aspect, a computer program product is provided. The computer program product includes at least one non-transitory computer-readable storage medium having computer program code stored thereon that, in execution with at least one processor, configures the computer program product to perform the steps of any one of the computer-implemented methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates a flowchart including operations of an example computer-implemented process in accordance with at least one example embodiment of the present disclosure.

FIG. 9 illustrates a flowchart including operations of an example computer-implemented process in accordance with at least one example embodiment of the present disclosure.

FIG. 11 illustrates an example user interface for updating playable audio data of a set of playable audio data via an authorized control device in accordance with at least one example embodiment of the present disclosure.

FIG. 12 illustrates an example user interface for preparing to initiate update of a set of playable audio data via an intermediary device in accordance with at least one example embodiment of the present disclosure.

FIG. 14 illustrates an example user interface indicating completion of an update of a set of playable audio data via an intermediary device in accordance with at least one example embodiment of the present disclosure.

DETAILED DESCRIPTION

Figure 1:
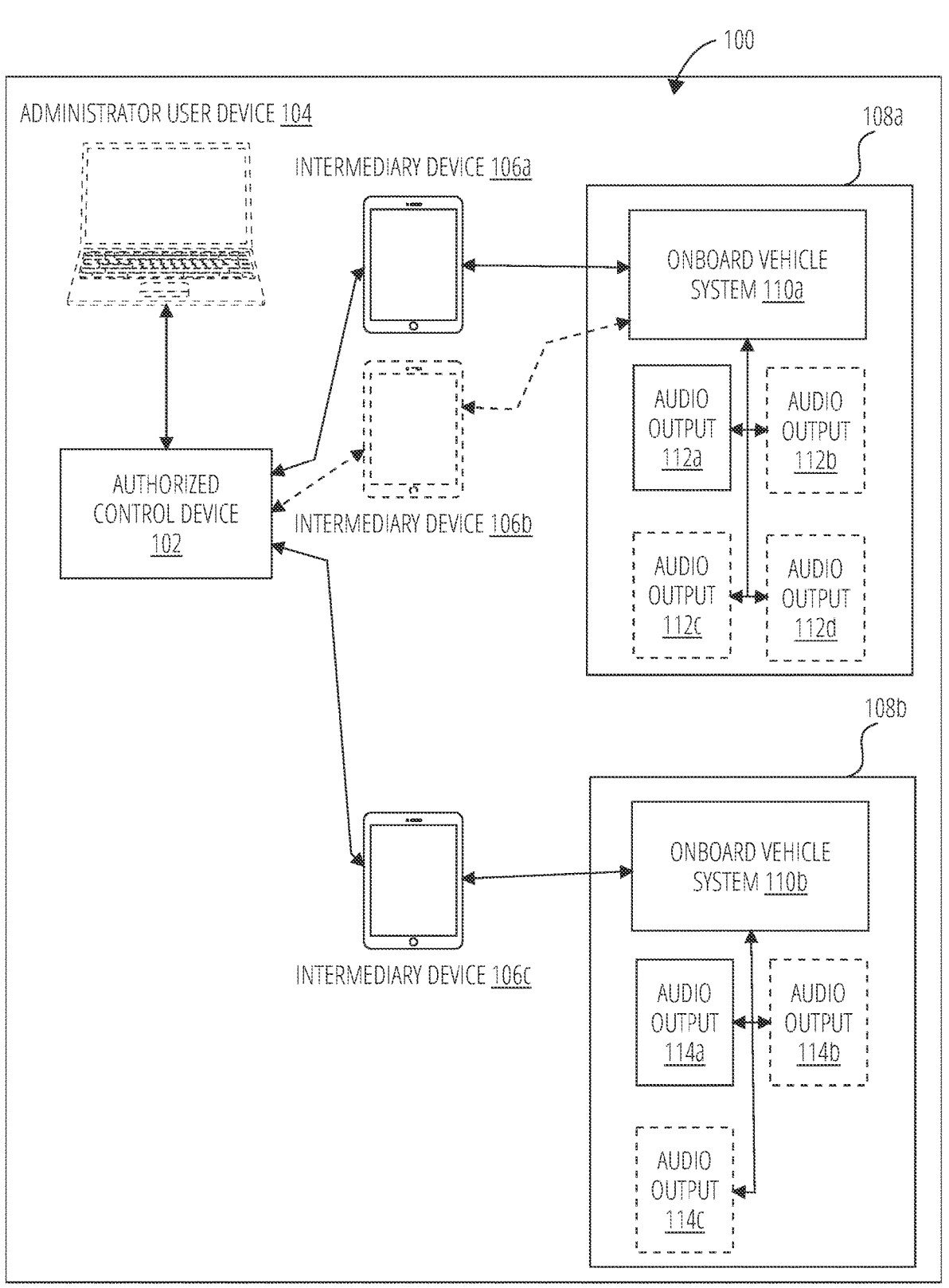
FIG. 1 illustrates a block diagram of an example system in which embodiments of the present disclosure may operate.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout.

Overview

In several contexts, particular audio data is to be outputted via audio output(s) of a vehicle. In some such contexts, the audio data to be outputted is fixed for a period of time. For example, a given entity that controls operation of commercial airplanes may output announcements, advertisements, music, and/or any other audio data via speakers of an aerial vehicle during boarding of passengers, while in flight, during takeoff and/or landing, and/or during disembarking of the aerial vehicle. Particular vehicles may be subject to different requirements, regulations, and/or the like that limit available implementations for outputting such audio. For example, returning to the example context of commercial airline travel, FAA regulations, company policies, and/or the like may require that audio systems for outputting audio data onboard a commercial airliner utilize directly coupled connections between a system that triggers output of audio data and the speakers, headsets, and/or other audio outputs that product such output of the audio data. Such implementations enable operation for outputting audio data while simultaneously maintaining security of playable audio data stored for outputting (e.g., to ensure unauthorized third-parties cannot update the playable audio data), and enable ongoing operational security of such implementations in circumstances where non-wired implementations may face interference or otherwise cease proper operation.

Existing implementations that satisfy applicable regulations and requirements suffer from various deficiencies and inefficiencies. Often, systems onboard a vehicle that facilitate audio output are fixed within the vehicle and unable to be readily updated. For example, returning to the example context of commercial airliners, onboard systems that facilitate audio output often include fixed memory media storing playable audio data, where updating of the playable audio data for outputting requires removal of the fixed memory media from the onboard system via disassembly of at least a portion of the vehicle, the onboard system, and the like. Additionally, even once the fixed memory media is removed, often the reconfiguration of the fixed memory media requires additional engineering and specialized knowledge by an expert to update the playable audio data available for subsequent playing onboard the vehicle. Such reconfiguring is not only costly, time consuming, and difficult such that deployment on a regular basis, or at scale, is impractical or otherwise impossible to implement.

Embodiments of the present disclosure provide for improved controlled output of audio data, particularly in a vehicle. Some embodiments of the present disclosure provide for improved storage of a set of playable audio data, including any number of portions of, playable audio data via an onboard vehicle system that is onboard a vehicle. The onboard vehicle system is specially configured to enable output of particular playable audio data via at least one audio output onboard the vehicle. The onboard vehicle system is communicable with via an intermediary device that forwards particular set of playable audio data for storage and subsequent output. The intermediary device is communicable with an authorized control device. The authorized control device is configured to enable generation, maintenance, and/or other alteration of one or more sets of playable audio data, each set of playable audio data embodying any number of portions of playable audio data that each include audio data files or other data structures. The authorized control device may be accessible only to authenticated administrators using an administrator user device, for example to enable the authenticated administrator to create a new set of playable audio data, add playable audio data to a set of playable audio data, remove playable audio data from a set of playable audio data, and/or the like. A set of playable audio data from any number of available playable sets in some such embodiments is subsequently retrievable from the authorized control device by an intermediary device for forwarding to the onboard vehicle system to enable subsequent outputting via audio output(s) of a vehicle.

Embodiments of the present disclosure enable such actions via particular communication networks and configurations. For example, some embodiments enable audio data to be transferred between devices for subsequent storage (e.g., between an authorized control device, an intermediary device, and an onboard vehicle system) via wireless communications networks. The wireless communications networks enable flexible yet secure management of playable audio data between the various devices, and ultimately stored to an onboard vehicle system for outputting onboard a particular vehicle. Additionally, some embodiments enable audio data to be outputted to a vehicle via directly coupled connects to at least one audio output, for example via a wired communications network between the onboard vehicle system and the at least one audio output. The direct coupling between the onboard vehicle system and audio outputs of a vehicle enable the audio data to be securely managed and outputted onboard the vehicle while satisfying applicable regulations and/or requirements, and/or without exposing the onboard components to deficiencies and security risks associated with wireless connectivity to such components. In this regard, embodiments of the present disclosure are advantageous to both the security and functionality such implementations for outputting audio data onboard a vehicle.

Definitions

"Administrator user device" refers to any hardware, software, firmware, and/or any combination thereof, connected to an authorized control device and that is enabled to alter a set of playable audio data. Altering a set of playable audio data includes creating a new set of playable audio data, adding playable audio data to a set of playable audio data, removing playable audio data from a set of playable audio data, re-ordering playable audio data of a set of playable audio data, and any other action that affects the playable audio data available associated with a particular sets of playable audio data.

"Audio output" refers to any hardware, software, firmware, and/or any combination thereof, that outputs audio signals. Non-limiting examples of an audio output includes a speaker, a headset, an earbud, a handset telephone, and a combination of devices that output audio signals.

"Audio selection interface" refers to a user interface that includes any number of interface elements configured to select at least one portion of playable audio data from a set of playable audio data. The selected portion of playable audio data in some embodiments is represented by the "selected playable audio data."

"Authorized control device" refers to any hardware, software, firmware, and/or any combination thereof, that maintains any number of sets of playable audio data. At least one set of playable audio data is stored via the authorized control device via input from an administrator user device. At least a portion of the sets of playable audio data is made retrievable by the authorized control device to one or more intermediary device, the portion of the sets of playable audio data representing an "available playable set."

"Available playable set" refers to any number of sets of playable audio data retrievable via an authorized control device.

"Directly coupled" refers to a state of connection between an onboard vehicle system and at least one audio output that includes one or more wired communications networks in accordance with one or more vehicle regulations.

"Intermediary device" refers to any hardware, software, firmware, and/or any combination thereof, that retrieves at least one set of playable audio data from an authorized control device and forwards the retrieved set of playable audio data to at least one onboard vehicle system.

"Onboard vehicle system" refers to hardware, software, firmware, and/or any combination thereof, that is onboard a vehicle and stores at least one set of playable audio data to enable outputting of at least a portion of the at least one set of playable audio data via at least one audio output of the vehicle.

"Playable audio data" refers to electronically managed data representing audio that is outputtable via at least one audio output/Non-limiting examples of playable audio data includes a file including music data, and/or a file including a recorded advertisement, a file including an audio announcement, where the file is embodied in any interpretable file format.

"Request" refers to electronically managed data transmissible to an authorized control device to initiate retrieval of at least one particular set of playable audio data.

"Requested parameter" refers to electronically managed data in a request that embodies a data value for a particular data parameter to be compared to a particular data value of a retrieval parameter associated with a set of playable audio data stored via an authorized control device.

"Retrieval parameter" refers to electronically managed data for a particular data parameter corresponding to a set of playable audio data that, if matched, is utilized to retrieve the corresponding set of playable audio data.

"Selected playable audio data" refers to a particular set of playable audio data from a set of all available playable sets maintained by an authorized control device that is selected for retrieval from the authorized control device.

"Set" refers to at least one data structure that includes any number of data portions and/or data objects. A "set of" data object refers to a set that includes at least any number of that particular type of data object. For example, a set of playable audio data refers to a set that includes any number of portions of playable audio data/

"Vehicle" refers to any machine, robot, apparatus, or other construction that traverses via at least one medium. Non-limiting examples of a vehicle include, without limitation, an aerial vehicle, a drone, a commercial airliner, a car, a truck, an autonomous vehicle, a boat, a submarine, and a multi-medium traversing machine.

"Wireless communications network" refers to any one or more digital and/or physical connections that enable over-the-air communications between at least a first computing device embodied in hardware, software, firmware, and/or any combination thereof, and a second computing device embodied in hardware, software, firmware, and/or any combination thereof. Non-limiting examples of a wireless communications network include the Internet, Bluetooth, Zig-Bee, NFC, Wi-Fi, WAN, LAN, PAN, MAN, and a hybrid network including at least a portion of wired connections.

Example Systems and Apparatuses of the Disclosure

FIG. 1 illustrates a block diagram of an example system in which embodiments of the present disclosure may operate. Specifically, FIG. 1 illustrates an example system 100 specially configured in accordance with the present disclosure for improved audio outputting. The system 100 includes an authorized control device 102, which may be controlled directly and/or via peripherals connected to the authorized control device 102 and/or via one or more connected client devices, for example the administrator user device 104. The system 100 further includes any number of intermediary devices, including one or more of intermediary device 106a-intermediary device 106c. The system 100 further includes any number of audio outputting systems onboard any number of vehicles, for example at least one of vehicle 108a and/or vehicle 108b. The vehicles each include a specially configured audio outputting system in accordance with the present disclosure, for example vehicle 108a including onboard vehicle system 110a and any number of audio outputs, including one or more of audio output 112a-112d, and vehicle 108b including onboard vehicle system 110b and any number of audio outputs, including one or more of audio output 114a-114c.

In some embodiments, one or more of the depicted computing components and/or system is communicable over one or more particular communications networks. For example, in some embodiments, any of the intermediary devices 106a-106c is communicable with the authorized control device 102 over a first wireless communications network. It should be appreciated that the first wireless communications network in some embodiments is embodied in any of a myriad of network configurations. In some embodiments, the first wireless communications network embodies a public network (e.g., the Internet). In some embodiments, the first wireless communications network embodies a private network (e.g., an internal localized, or closed-off wireless network between particular devices). In some other embodiments, the first wireless communications network embodies a hybrid network (e.g., a network enabling internal communications between particular connected devices and external communications with other devices). The first wireless communications network in some embodiments includes one or more base station(s), relay(s), router(s), switch(es), cell tower(s), communications cable(s) and/or associated routing station(s), and/or the like. In some embodiments, the first wireless communications network includes one or more user controlled computing device(s) (e.g., a user owned router and/or modem) and/or one or more external utility devices (e.g., Internet service provider communication tower(s) and/or other device(s)).

In some embodiments, the authorized control device 102 and the administrator user device 104 communicate over a second communications network. The second communications network in some embodiments is the same network as the first wireless communications network that connects the authorized control device 102 with any number of the intermediary devices. For example, in some embodiments, the authorized control device 102 and the administrator user device 104 are communicable over the Internet or any other wireless communications network configured as discussed with respect to the first wireless communications network. In some embodiments, the second communications network is configured differently than the first communications network. For example, in some embodiments, the authorized control device 102 and the administrator user device 104 are communicable over a LAN, WAN, or private network while the authorized control device 102 and the one or more intermediary devices communicate over a public wireless communications network. Additionally or alternatively, in some embodiments the authorized control device 102 and the administrator user device 104 are connected via a wired communications network.

The authorized control device 102 includes any number of computing devices, systems, and/or the like, that facilitates maintenance of at least one set of playable audio data. In some embodiments, the authorized control device 102 includes application server(s), database server(s), end user device(s), cloud computing system(s), personal computer(s), and/or the like. Indeed, the authorized control device 102 may be embodied in any combination of hardware, software, firmware, and/or combination thereof, that is configured via computer-coded instructions to perform the functionality described herein. The authorized control device 102 may be comprised of a single computing device, a single system, or a combination of distinct computing devices and/or subsystems. Additionally or alternatively, in some embodiments, the authorized control device 102 includes one or more client devices, user devices, and/or the like, that enables access to functionality provided via the optimized control system 102, for example via a web application, native application, and/or the like. For example, in some embodiments the administrator user device 104 embodies a client device for accessing functionality of the authorized control device 102. In some embodiments, the administrator user device 104 includes a smart phone, tablet, personal computer, laptop, virtual digital assistant, and/or the like. In some such embodiments, the administrator user device 104 communicates with the authorized control device 102 via a particular user interface rendered to the administrator user device 104 that provides such functionality, for example via a native application or a web interface rendered to the administrator user device 104.

The authorized control device 102 includes hardware, software, firmware, and/or any combination thereof, that stores at least one set of playable audio data, and/or transmits at least one set of playable audio data to at least one intermediary device for further processing. Such altering in some embodiments includes creating a set of playable audio data, adding one or more portions of playable audio data to a set of playable audio data, removing one or more portions of playable audio data from a set of playable audio data, and/or attributing one or more particular retrieval parameters to a set of playable audio data. Any stored set of playable audio data may then be retrieved, for example via request, for further processing as described herein. In some embodiments, the authorized control device 102 maintains any number of available playable sets, each embodying a distinct set of playable audio data.

In some embodiments, each intermediary device (e.g., each of the intermediary device 106a, intermediary device 106b, and/or intermediary device 106c) includes any number of computing devices, systems, and/or the like, that facilitate requesting of, retrieval of, and/or forwarding of playable audio data. In some embodiments, an intermediary device includes an end user device that is communicable with at least the authorized control device 102. For example, in some embodiments an intermediary device includes or is embodied by a smartphone, tablet, personal computer, laptop, and/or the like that is manipulatable by a particular end user. An intermediary device in some embodiments accesses a particular application embodied by a native application or web application via a browser application executed on the intermediary device to perform particular functionality that accesses the authorized control device 102. In one example context, each intermediary device embodies a tablet of a flight attendant or other travel attendant responsible for outputting audio during a particular trip onboard a vehicle.

In some embodiments, an intermediary device is associated with a particular vehicle. For example, as illustrated, the intermediary device 106a and the intermediary device 106b are associated with the vehicle 108a, and the intermediary device 106c is associated with the vehicle 108b. In some embodiments, a particular intermediary device is associated with a particular vehicle based at least in part on a device identifier, hardware identifier, and/or other device-specific data fixed or otherwise unique to the specially configured intermediary device. Additionally or alternatively, in some embodiments, a user inputs data to an intermediary device to cause an association between the intermediary device and a corresponding vehicle. For example, in some embodiments, a user logs into and/or otherwise provides authentication credentials, selects particular trip information, and/or otherwise identifies data that dynamically associates the intermediary device to a particular vehicle. In some embodiments, an intermediary device is associated with a particular vehicle based at least in part on an identity of a user of the intermediary device, for example where a user is associated with a particular vehicle and/or trip information. Data utilized to associate an intermediary device with a particular vehicle in some embodiments is usable to retrieve a particular set of playable audio data from the authorized control device 102 based at least in part on such an association and corresponding data.

In some embodiments, an intermediary device is configured to retrieve particular playable audio data embodying a particular set of playable audio data made available via the authorized control device 102. In some such embodiments, the intermediary device generates a request for particular playable audio data (e.g., a particular set of playable audio data of any available playable sets from the authorized control device 102) based at least in part on data associated with the intermediary device and/or user input via the intermediary device (e.g., selecting a particular set of playable audio data). The intermediary device is further configured to forward retrieved playable audio data to an onboard vehicle system of an associated vehicle. For example, as illustrated, the intermediary device 106a and/or intermediary device 106b in some embodiments forwards playable audio data to the onboard vehicle system 110a of the vehicle 108a, and the intermediary device 106c forwards playable audio data to the onboard vehicle system 110b of the vehicle 108b. In some embodiments, an intermediary device utilizes the same communications networks to retrieve playable audio data from the authorized control device 102 and forward such data to a corresponding onboard vehicle system, for example the Internet. In other embodiments, an intermediary device is configured to establish a separate and/or private connection with the onboard vehicle system to enable forwarding of playable audio data via the private connection with the onboard vehicle system. For example, in some embodiments, the intermediary device 106a connects with onboard vehicle system 110a via an onboard Wi-Fi or other network of the vehicle 108a, and intermediary device 106c connects with onboard vehicle system 110b via an onboard Wi-Fi or other network of the vehicle 108b. In some embodiments, an intermediary device such as the intermediary device 106a is required to connect with an onboard communications network (e.g., a vehicle's Wi-Fi network) to facilitate communication with the onboard vehicle system of that particular vehicle. In some such embodiments, the intermediary device and/or the onboard vehicle system to which the intermediary device is connecting may perform one or more validations that confirm the intermediary device is connected via the onboard communications network. Additionally or alternatively, in some embodiments, the intermediary device may preferably be connected to the onboard communications system of the vehicle that includes the onboard vehicle system to which the intermediary device is connecting, but the intermediary device may alternatively or additionally connect with the onboard vehicle system via another communications network as well (e.g., via a cellular connection network, the Internet, and/or the like).

In some embodiments, an onboard vehicle system (e.g., onboard vehicle system 110a and/or onboard vehicle system 110b) includes any number of computing devices, systems, and/or the like, that facilitate outputting of particular playable audio data via one or more audio outputs onboard a vehicle. In some embodiments, the onboard vehicle system 110a and/or onboard vehicle system 110b includes application server(s), database server(s), end user device(s), personal computer(s), laptop(s), and/or the like. Additionally or alternatively, in some embodiments, the onboard vehicle system is integrated with or otherwise embedded onboard a corresponding vehicle, for example where onboard vehicle system 110a integrated into a cockpit or service area of an aerial vehicle embodying vehicle 108a, and/or onboard vehicle system 110b is integrated into a driver or attendant area of a ground or aerial vehicle embodying onboard vehicle system 110b.

In some embodiments, an onboard vehicle system is directly coupled with any number of audio outputs. Each audio output includes a computing device embodied in hardware, software, firmware, and/or any combination thereof, that enables output of audio. For example, in some embodiments, an audio output embodies a speaker integrated into the body or otherwise located onboard the particular vehicle upon which the corresponding onboard vehicle system is similarly located. In some embodiments, for example, the onboard vehicle system 110a is directly coupled via one or more wired communications network with one or more of audio outputs audio output 112a, 112b, 112c, and/or 112d, each embodying an integrated speaker, a standalone speaker, a display device including a speaker, an audio headset jack, and/or the like that enables outputting of audio signals to be heard by a particular user onboard the vehicle. It should be appreciated that a vehicle may be associated with any number of audio outputs, for example the onboard vehicle system 110b is directly coupled with each of audio output 114a, audio output 114b, and/or audio output 114c.

In some embodiments, an onboard vehicle system is specially configured to store at least one set of playable audio data, for example forwarded from an authorized control device 102 via at least one associated intermediary device. In some embodiments, an onboard vehicle system includes one or more displays and/or associated peripheral controls that enables user interaction with the onboard vehicle system for outputting particular selected playable audio data. For example, in some embodiments, the onboard vehicle system 110a includes at least one display and/or other peripherals that depicts each set of playable audio data stored by the onboard vehicle system 110a to enable selection of one of the sets of playable audio data, each portion of playable audio data in a set of playable audio data (e.g., a selected set of playable audio data in a circumstance where multiple sets are available) to enable selection of one of the playable audio data for outputting, and/or adjustment of parameters associated with the outputting (e.g., volume, seeking to a different timestamp of an audio file, and/or the like). The onboard vehicle system 110*b* may similarly function with respect to the onboard vehicle system 110*a*, including any number of different portions of playable audio data and/or different sets of playable audio data. Non-limiting examples of user interfaces renderable via the onboard vehicle system are described further herein.

Figure 2:
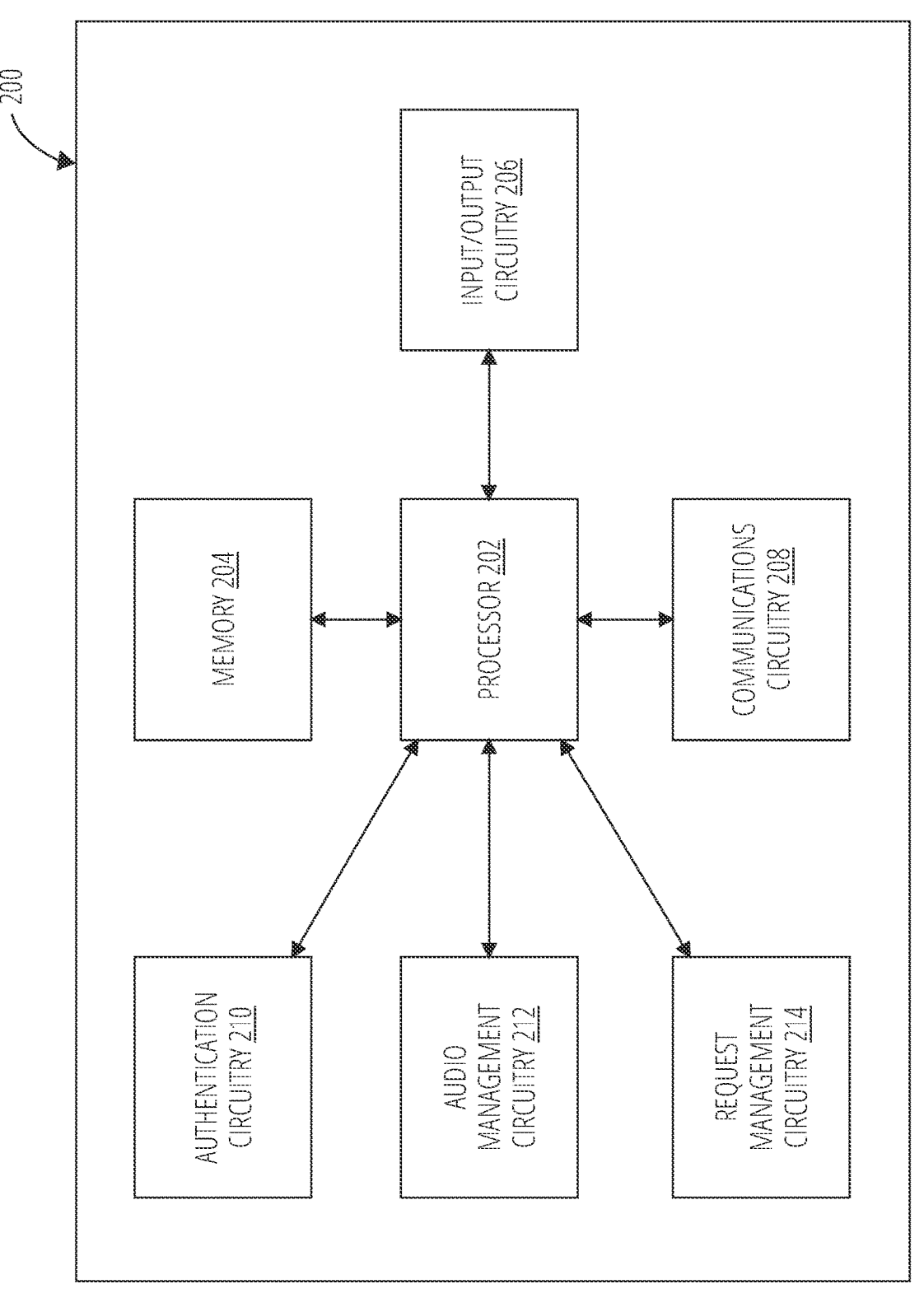
FIG. 2 illustrates a block diagram of an apparatus embodying an example authorized control device in accordance with at least one example embodiment of the present disclosure.

FIG. 2 illustrates a block diagram of an apparatus embodying an example authorized control device in accordance with at least one example embodiment of the present disclosure. Specifically, FIG. 2 depicts an example authorized control apparatus ("apparatus 200") specially configured in accordance with at least some example embodiments of the present disclosure. In some embodiments, the authorized control device 102 and/or a portion thereof is embodied by one or more system(s), such as the apparatus 200 as depicted and described in FIG. 2. The apparatus 200 includes processor 202, memory 204, input/output circuitry 206, communications circuitry 208, authentication circuitry 210, audio management circuitry 212, and request management circuitry 214. In some embodiments, the apparatus 200 is configured, using one or more of the sets of circuitry embodied by processor 202, memory 204, input/output circuitry 206, communications circuitry 208, authentication circuitry 210, audio management circuitry 212, and/or request management circuitry 214, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with controlled management of sets of playable audio data. In some such embodiments, the processor 202 includes hardware, software, firmware, and/or a combination thereof that receives input representing playable audio data to be stored as part of a set of playable audio data. Additionally or alternatively, in some embodiments, the processor 202 includes hardware software, firmware, and/or a combination thereof that stores at least one set of playable audio data, each set of playable audio data associated with at least one retrieval parameter. Additionally or alternatively, in some embodiments, the processor 202 includes hardware software, firmware, and/or a combination thereof that receives a request to retrieve at least one particular set of playable audio data. Additionally or alternatively, in some embodiments, the processor 202 includes hardware software, firmware, and/or a combination thereof that retrieves a stored set of playable audio data. Additionally or alternatively, in some embodiments, the processor 202 includes hardware software, firmware, and/or a combination thereof that transmits a set of playable audio data to at least one intermediary device.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes authentication circuitry 210. The authentication circuitry 210 includes hardware, software, firmware, and/or a combination thereof, that supports authenticated control of access to stored playable audio data. For example, in some embodiments, the authentication circuitry 210 includes hardware, software, firmware, and/or a combination thereof, that receives user credentials associated with a user. Additionally or alternatively, in some embodiments, the authentication circuitry 210 includes hardware, software, firmware, and/or a combination thereof, that authenticates received user credentials as associated with a particular administrator user. Additionally or alternatively, in some embodiments, the authentication circuitry 210 includes hardware, software, firmware, and/or a combination thereof, that authenticates a particular device as an administrator user device associated with a particular authenticated session linked to an administrator user account. Additionally or alternatively, in some embodiments, the authentication circuitry 210 includes hardware, software, firmware, and/or a combination thereof, that grants permissions to particular sets of audio data based on a particular administrator user account associated with an administrator user device. In some embodiments, authentication circuitry 210 includes a separate processor, specially configured field programmable gate array (FPGA), or a specially programmed application specific integrated circuit (ASIC).

In some embodiments, the apparatus 200 includes audio management circuitry 212. The audio management circuitry 212 includes hardware, software, firmware, and/or a combination thereof, that supports maintenance of sets set of playable audio data stored via the apparatus 200. For example, in some embodiments, the update management circuitry 212 includes hardware, software, firmware, and/or a combination thereof, that creates a new set of playable audio data. Additionally or alternatively, in some embodiments, the audio management circuitry 212 includes hardware, software, firmware, and/or a combination thereof, that alters a set of playable audio data, including and without limitation by adding a portion of playable audio data to the set of playable audio data and/or removing a portion of playable audio data from the set of playable audio data. Additionally or alternatively, in some embodiments, the update management circuitry 212 includes hardware, software, firmware, and/or a combination thereof, that assigns at least one retrieval parameter to at least one set of playable audio data. Additionally or alternatively, in some embodiments, the update management circuitry 212 includes hardware, software, firmware, and/or a combination thereof, that provides access to stored sets of playable audio data as available playable sets for retrieval. In some embodiments, audio management circuitry 212 includes a separate processor, specially configured field programmable gate array (FPGA), or a specially programmed application specific integrated circuit (ASIC).

In some embodiments, the apparatus 200 includes request management circuitry 214. The request management circuitry 214 includes hardware, software, firmware, and/or a combination thereof, that supports processing of requests for an available playable set from stored sets of playable audio data. For example, in some embodiments, the request management circuitry 214 includes hardware, software, firmware, and/or a combination thereof, that receives a request for retrieval of at least one set of playable audio data from an intermediary device. Additionally or alternatively, in some embodiments, the request management circuitry 214 includes hardware, software, firmware, and/or a combination thereof, that retrieves at least one set of playable audio data for transmission to at least one intermediary device. Additionally or alternatively, in some embodiments, the request management circuitry 214 includes hardware, software, firmware, and/or a combination thereof, that processes a received request to determine particular data utilized in retrieving a particular one or more sets of playable audio data. For example, in some embodiments the request management circuitry 214 processes a received request to identify one or more requested parameters utilized to retrieve a corresponding set of playable audio data stored associated with at least one retrieval parameter that matches the one or more requested parameters. Additionally or alternatively, in some embodiments, the request management circuitry 214 includes hardware, software, firmware, and/or a combination thereof, that transmits a retrieved set of playable audio data to intermediary device. In some embodiments, request management circuitry 214 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, authentication circuitry 210, audio management circuitry 212, and request management circuitry 214 are combined. Alternatively or additionally, in some embodiments, one or more of the processor 202, memory 204, input/output circuitry 206, communications circuitry 208, authentication circuitry 210, audio management circuitry 212, and/or request management circuitry 214 perform some or all of the functionality described associated with another component. For example, in some embodiments, two or more of the processor 202, memory 204, input/output circuitry 206, communications circuitry 208, authentication circuitry 210, audio management circuitry 212, and/or request management circuitry 214, are combined into a single module embodied in hardware, software, firmware, and/or a combination thereof. Similarly, in some embodiments, one or more of the sets of circuitry, for example authentication circuitry 210, audio management circuitry 212, and/or request management circuitry 214, is/are combined with the processor 202, such that the processor 202 performs one or more of the operations described above with respect to each of these sets of circuitry embodied by the authentication circuitry 210, audio management circuitry 212, and/or request management circuitry 214.

Figure 3:
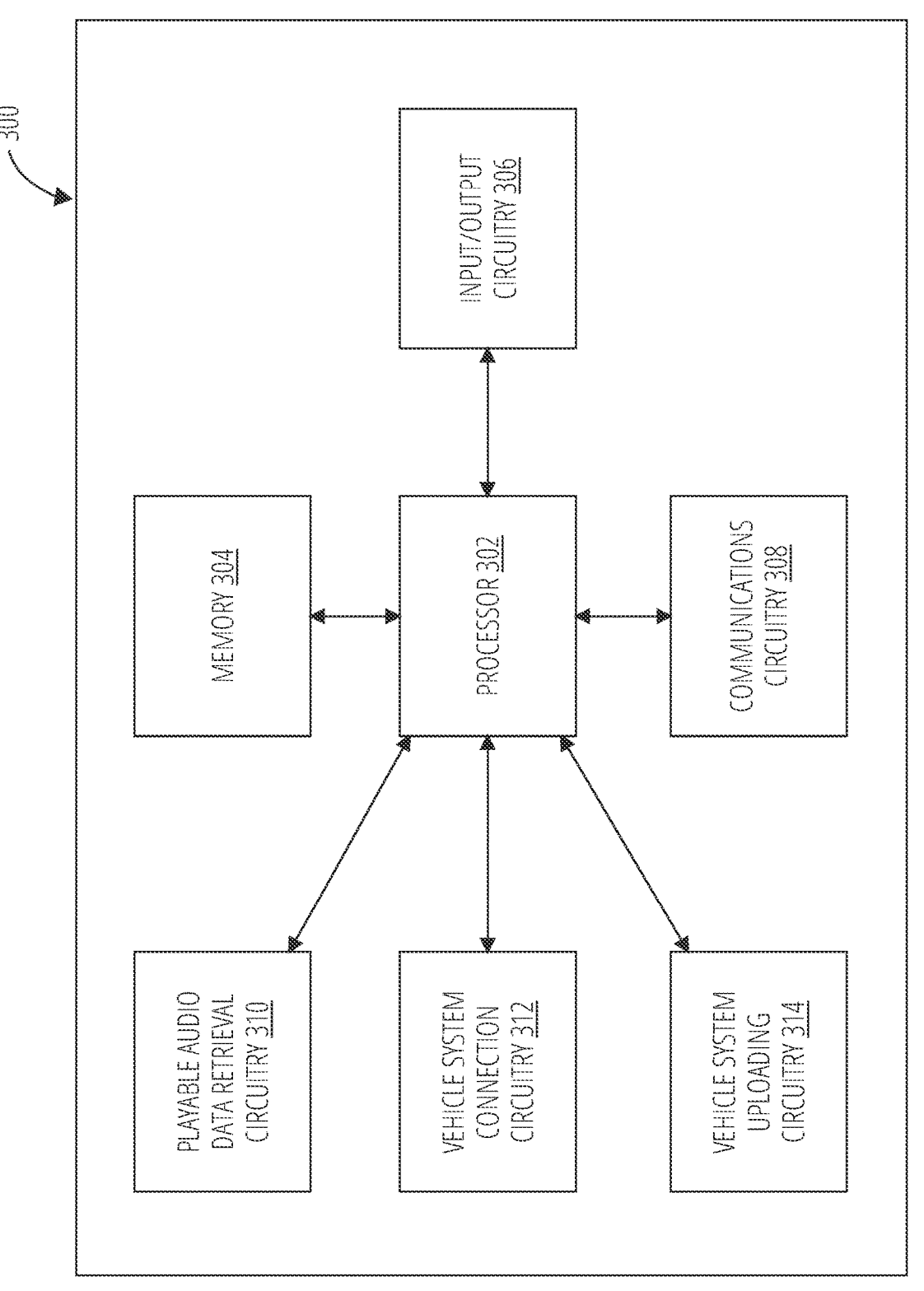
FIG. 3 illustrates a block diagram of an apparatus embodying an example intermediary device in accordance with at least one example embodiment of the present disclosure.

FIG. 3 illustrates a block diagram of an apparatus embodying an example intermediary device in accordance with at least one example embodiment of the present disclosure. Specifically, FIG. 3 illustrates an example intermediary apparatus 300 ("apparatus 300") specifically configured in accordance with at least one example embodiment of the present disclosure. In some embodiments an intermediary device, such as each of the intermediary device intermediary devices 106a-106c is/are embodied by one or more system(s), device(s), and/or the like, such as the apparatus 300 as depicted and described in FIG. 3. The apparatus 300 includes processor 302, memory 304, input/output circuitry 306, communications circuitry 308, playable audio data retrieval circuitry 310, vehicle system connection circuitry 312, and vehicle system uploading circuitry 314. In some embodiments, the apparatus 300 is configured, using one or more of the processor 302, memory 304, input/output circuitry 306, communications circuitry 308, playable audio data retrieval circuitry 310, vehicle system connection circuitry 312, and/or vehicle system uploading circuitry 314, to execute and perform one or more of the operations described herein.

In some embodiments, the processor 302, memory 304, input/output circuitry 306, and communications circuitry 308, function similarly or identically to the similarly named sets of circuitry embodying processor 202, memory 204, input/output circuitry 206, and communications circuitry 208 as depicted and described with respect to the apparatus 200 in FIG. 2. Additionally or alternatively, in some embodiments, the processor 302 includes hardware, software, firmware, and/or a combination thereof, that supports functionality performed by the intermediary devices as depicted and described with respect to FIG. 1. For example, in some embodiments, the processor 302 includes hardware, software, firmware, and/or a combination thereof, that supports retrieval of one or more sets from an authorized control device, storing of one or more sets set of playable audio data, and/or forwarding of playable audio data to an onboard vehicle system. For purposes of brevity, repeated disclosure with respect to the functionality of such similarly-named sets of circuitry is omitted herein.

In some embodiments, the apparatus 300 includes playable audio data retrieval circuitry 310. The playable audio data retrieval circuitry 310 includes hardware, software, firmware, and/or a combination thereof, that supports retrieving of at least one set of playable audio data from an authorized control device. For example, in some embodiments, the playable audio data retrieval circuitry 310 includes hardware, software, firmware, and/or a combination thereof, that generates a request to an authorized control device, the request configured to trigger retrieval of one or more sets set of playable audio data. In some embodiments, the request includes one or more requested parameters for use in retrieving corresponding sets of playable audio data. Additionally or alternatively, in some embodiments, the playable audio data retrieval circuitry 310 includes hardware, software, firmware, and/or a combination thereof, that transmits a request to an authorized control device. Additionally or alternatively, in some embodiments, the playable audio data retrieval circuitry 310 includes hardware, software, firmware, and/or a combination thereof, that receives a response to a request from an authorized control device, the response including at least a set of playable audio data for forwarding and/or storage. Additionally or alternatively, in some embodiments, the playable audio data retrieval circuitry 310 includes hardware, software, firmware, and/or a combination thereof, that stores at least one set of playable audio data received from an authorized control device. In some embodiments, playable audio data retrieval circuitry 310 includes a separate processor, specially configured field programmable gate array (FPGA), or a specially programmed application specific integrated circuit (ASIC).

In some embodiments, the apparatus 300 includes vehicle system connection circuitry 312. The vehicle system connection circuitry 312 includes hardware, software, firmware, and/or a combination thereof, that supports connection with a particular onboard vehicle system. The vehicle system connection circuitry 312 includes hardware, software, firmware, and/or a combination thereof, that supports receiving an indication of particular onboard vehicle system with which to connect. In some embodiments, the vehicle system connection circuitry 312 receives the indication automatically in response to detecting a wireless communications network associated with the onboard vehicle system. In some embodiments, the vehicle system connection circuitry 312 receives user input indicating a wireless communications network to connect to, where the wireless communications network is associated with the onboard vehicle system. For example, the user may select a particular wireless communications network to connect to, where the wireless communications network is associated with a particular onboard vehicle system, or in some embodiments the user provides user input via a particular user interface to select a particular travel identifier, flight identifier, vehicle identifier, or other data that is uniquely associated with the onboard vehicle system with which to connect. Additionally or alternatively, in some embodiments, the vehicle system connection circuitry 312 includes hardware, software, firmware, and/or a combination thereof, that maintains a connection with the onboard vehicle system via a wireless communications network. Additionally or alternatively, in some embodiments, the vehicle system connection circuitry 312 includes hardware, software, firmware, and/or a combination thereof, that receives authentication credentials utilized to connect to a wireless network associated with the onboard vehicle. Additionally or alternatively, in some embodiments, the vehicle system connection circuitry 312 includes hardware, software, firmware, and/or a combination thereof, that establishes connection with an onboard vehicle system via a wired connection directly with the onboard vehicle system. In some embodiments, vehicle system connection circuitry 312 includes a separate processor, specially configured field programmable gate array (FPGA), or a specially programmed application specific integrated circuit (ASIC).

In some embodiments, the apparatus 300 includes vehicle system uploading circuitry 314. The vehicle system uploading circuitry 314 includes hardware, software, firmware, and/or a combination thereof, that supports forwarding of playable audio data to an onboard vehicle system. For example, in some embodiments, the vehicle system uploading circuitry 314 includes hardware, software, firmware, and/or a combination thereof, that receives an indication initiating transfer of at least a portion of a set of playable audio data to a connected onboard vehicle system. In some embodiments, the vehicle system uploading circuitry 314 receives the indication automatically, for example upon connection with the onboard vehicle system. In some embodiments, transfer is initiated in response to user input via a specially configured user interface that triggers the transfer. Additionally or alternatively, in some embodiments, the vehicle system uploading circuitry 314 includes hardware, software, firmware, and/or a combination thereof, that forwards a set of playable audio data to an onboard vehicle system connected to the apparatus 300. Additionally or alternatively, in some embodiments, the vehicle system uploading circuitry 314 includes hardware, software, firmware, and/or a combination thereof, that causes the onboard vehicle system to store any number of sets of playable audio data. In some embodiments, vehicle system uploading circuitry 314 includes a separate processor, specially configured field programmable gate array (FPGA), or a specially programmed application specific integrated circuit (ASIC).

Additionally or alternatively, in some embodiments, two or more of the sets of circuitries embodying processor 302. memory 304, input/output circuitry 306, communications circuitry 308, playable audio data retrieval circuitry 310, vehicle system connection circuitry 312, and/or vehicle system uploading circuitry 314 are combined. Alternatively or additionally, in some embodiments, one or more of the processor 302. memory 304, input/output circuitry 306, communications circuitry 308, playable audio data retrieval circuitry 310, vehicle system connection circuitry 312, and/or vehicle system uploading circuitry 314 perform some or all of the functionality described associated with another component. For example, in some embodiments, two or more of the processor 302. memory 304, input/output circuitry 306, communications circuitry 308, playable audio data retrieval circuitry 310, vehicle system connection circuitry 312, and/or vehicle system uploading circuitry 314, are combined into a single module embodied in hardware, software, firmware, and/or a combination thereof. Similarly, in some embodiments, one or more of the sets of circuitry, for example playable audio data retrieval circuitry 310, vehicle system connection circuitry 312, and/or vehicle system uploading circuitry 314, is/are combined with the processor 302, such that the processor 302 performs one or more of the operations described above with respect to each of these sets of circuitry embodied by the playable audio data retrieval circuitry 310, vehicle system connection circuitry 312, and/or vehicle system uploading circuitry 314.

Figure 4:
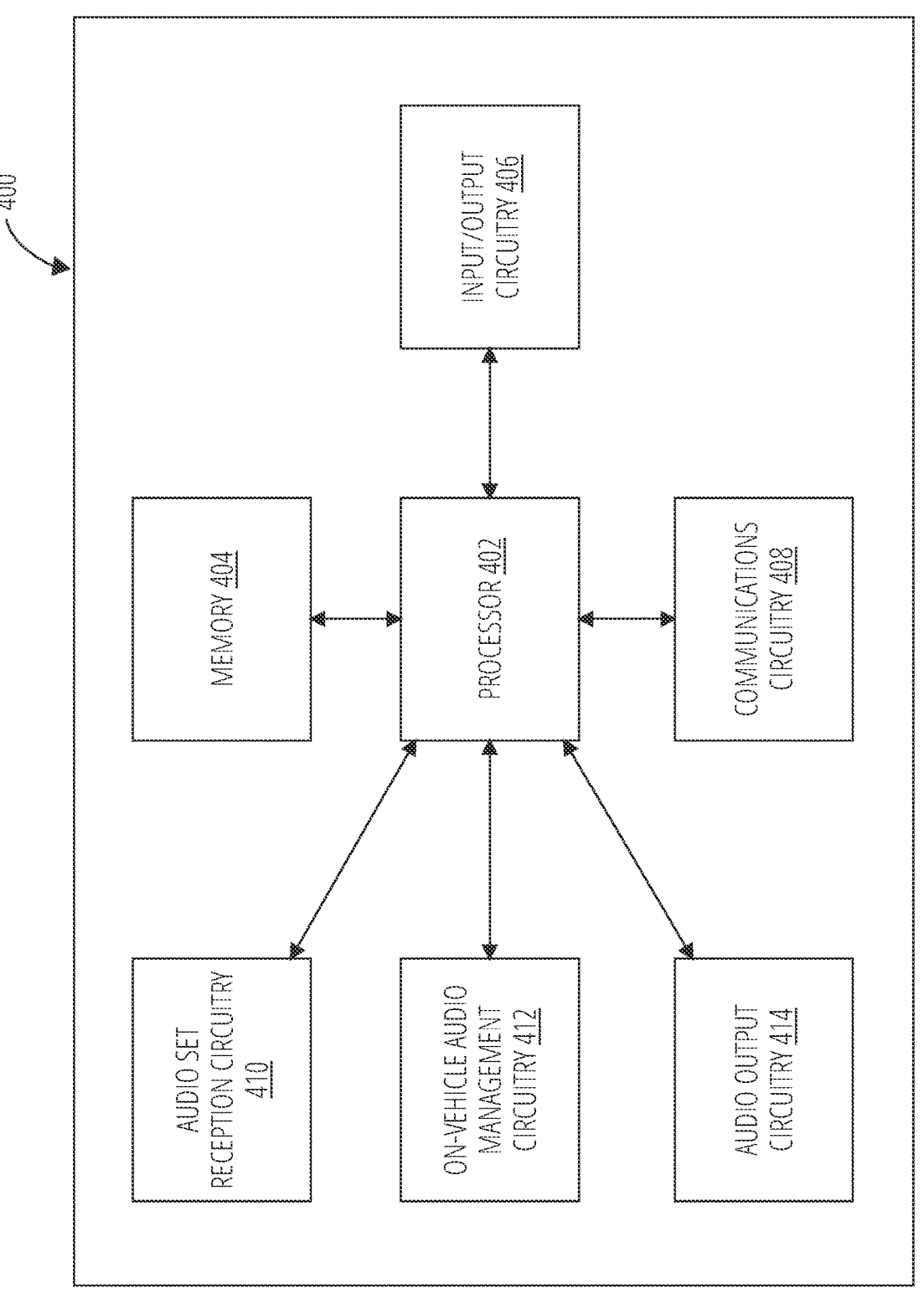
FIG. 4 illustrates a block diagram of an apparatus embodying an example onboard vehicle system in accordance with at least one example embodiment of the present disclosure.

FIG. 4 illustrates a block diagram of an apparatus embodying an example onboard vehicle system in accordance with at least one example embodiment of the present disclosure. Specifically, FIG. 4 illustrates an example onboard vehicle apparatus 400 ("apparatus 400") specifically configured in accordance with at least one example embodiment of the present disclosure. In some embodiments an onboard vehicle system, such as each of the onboard vehicle systems 110a-110b is/are embodied by one or more system(s), device(s), and/or the like, such as the apparatus 400 as depicted and described in FIG. 4. The apparatus 400 includes processor 402, memory 404, input/output circuitry 406, communications circuitry 408, audio set reception circuitry 410, on-vehicle audio management circuitry 412, and audio output circuitry 414. In some embodiments, the apparatus 400 is configured, using one or more of the processor 402, memory 404, input/output circuitry 406, communications circuitry 408, audio set reception circuitry 410, on-vehicle audio management circuitry 412, and/or audio output circuitry 414, to execute and perform one or more of the operations described herein.

In some embodiments, the processor 402, memory 404, input/output circuitry 406, and communications circuitry 408, function similarly or identically to the similarly named sets of circuitry embodying processor 202, memory 204, input/output circuitry 206, and communications circuitry 208 as depicted and described with respect to the apparatus 200 in FIG. 2. Additionally or alternatively, in some embodiments, the processor 402 includes hardware, software, firmware, and/or a combination thereof, that supports functionality performed by the vehicle onboard systems as depicted and described with respect to FIG. 1. For example, in some embodiments, the processor 402 includes hardware, software, firmware, and/or a combination thereof, that supports storage of received one or more sets set of playable audio data, rendering of user interfaces for triggering output of particular selected playable audio data, and outputting of playable audio data via at least one audio output. For purposes of brevity, repeated disclosure with respect to the functionality of such similarly-named sets of circuitry is omitted herein.

In some embodiments, the apparatus 400 includes audio set reception circuitry 410. The audio set reception circuitry 410 includes hardware, software, firmware, and/or a combination thereof, that supports storing of at least one received set of playable audio data. For example, in some embodiments, the audio set reception circuitry 410 includes hardware, software, firmware, and/or a combination thereof, that maintains a connection with at least one wireless communications network connected to at least one intermediary device. Additionally or alternatively, in some embodiments, the audio set reception circuitry 410 includes hardware, software, firmware, and/or a combination thereof, that receives at least one set of playable audio data from an intermediary device, for example over the maintained connection to at least one wireless communications network. Additionally or alternatively, in some embodiments, the audio set reception circuitry 410 includes hardware, software, firmware, and/or a combination thereof, that stores the at least one set of playable audio data received from an intermediary device. In some embodiments, the apparatus 400 is configured such that once a set of playable audio data, individual portions of the set of playable audio data are not independently manageable (e.g., cannot be deleted and/or added to) from the apparatus 400. In some embodiments, audio set reception circuitry 410 includes a separate processor, specially configured field programmable gate array (FPGA), or a specially programmed application specific integrated circuit (ASIC).

In some embodiments, the apparatus 400 includes on-vehicle audio management circuitry 412. The on-vehicle audio management circuitry 412 includes hardware, software, firmware, and/or a combination thereof, that supports interaction with at least one stored set of playable audio data to trigger output of particular selected playable audio data. For example, in some embodiments, the on-vehicle audio management circuitry 412 includes hardware, software, firmware, and/or a combination thereof, that renders user interfaces that depict portions of playable audio data from at least one stored set of playable audio data that is capable of being outputted. The user interfaces include interface elements that enable selection of a particular portion of playable audio data for outputting, and may include interface elements for volume control, seeking, skipping and/or rewinding to next/previous tracks, and/or the like. Additionally or alternatively, in some embodiments, the on-vehicle audio management circuitry 412 includes hardware, software, firmware, and/or a combination thereof, that enables initiation of outputting selected playable audio data and/or terminating outputting of selected playable audio data. In some embodiments, on-vehicle audio management circuitry 412 includes a separate processor, specially configured field programmable gate array (FPGA), or a specially programmed application specific integrated circuit (ASIC).

In some embodiments, the apparatus 400 includes audio output circuitry 414. The audio output circuitry 414 includes hardware, software, firmware, and/or a combination thereof, that supports outputting of playable audio data via at least one audio output. For example, in some embodiments, the audio output circuitry 414 includes hardware, software, firmware, and/or a combination thereof, that is directly coupled with at least one audio output, such as via a wired connection directly with the audio output. Additionally or alternatively, in some embodiments, the audio output circuitry 414 includes hardware, software, firmware, and/or a combination thereof, that includes at least one audio output via which audio is outputtable. Additionally or alternatively, in some embodiments, the audio output circuitry 414 includes hardware, software, firmware, and/or a combination thereof, that transmits signals of selected playable audio data to the at least one audio output. Once outputting of playable audio data is initiated, the audio output circuitry 414 may cause outputting of the corresponding audio to users onboard a vehicle. In some embodiments, audio output circuitry 414 includes a separate processor, specially configured field programmable gate array (FPGA), or a specially programmed application specific integrated circuit (ASIC).

Additionally or alternatively, in some embodiments, two or more of the sets of circuitries embodying processor 402, memory 404, input/output circuitry 406, communications circuitry 408, audio set reception circuitry 410, and/or audio output circuitry 414 are combined. Alternatively or additionally, in some embodiments, one or more of the processor 402, memory 404, input/output circuitry 406, communications circuitry 408, audio set reception circuitry 410, and/or audio output circuitry 414 perform some or all of the functionality described associated with another component. For example, in some embodiments, two or more of the processor 402, memory 404, input/output circuitry 406, communications circuitry 408, audio set reception circuitry 410, and/or audio output circuitry 414, are combined into a single module embodied in hardware, software, firmware, and/or a combination thereof. Similarly, in some embodiments, one or more of the sets of circuitry, for example audio set reception circuitry 410, on-vehicle audio management circuitry 412, and/or audio output circuitry 414, is/are combined with the processor 402, such that the processor 402 performs one or more of the operations described above with respect to each of these sets of circuitry embodied by the audio set reception circuitry 410, on-vehicle audio management circuitry 412, and/or audio output circuitry 414.

Example Data Architectures and Data Flows of the Disclosure

Having described example systems, components thereof, and apparatuses in accordance with the present disclosure, example data architectures and data flows in accordance with the present disclosure will now be discussed. The example data architectures may define particular data objects and/or data structures maintained by the example systems, devices, and/or apparatus described herein. Additionally or alternatively, in some embodiments, the data flows as depicted and described are performed via the systems, devices, and/or apparatuses as described above. For example, in some embodiments, data objects embodied in accordance with the data architectures described herein are processed in accordance with the data flows depicted and described herein by the system 100 as depicted and described with respect to FIG. 1 having the apparatuses embodied by apparatuses 200, 300, and 400 as depicted and described herein with respect to FIG. 2, FIG. 3, and FIG. 4.

Figure 5:
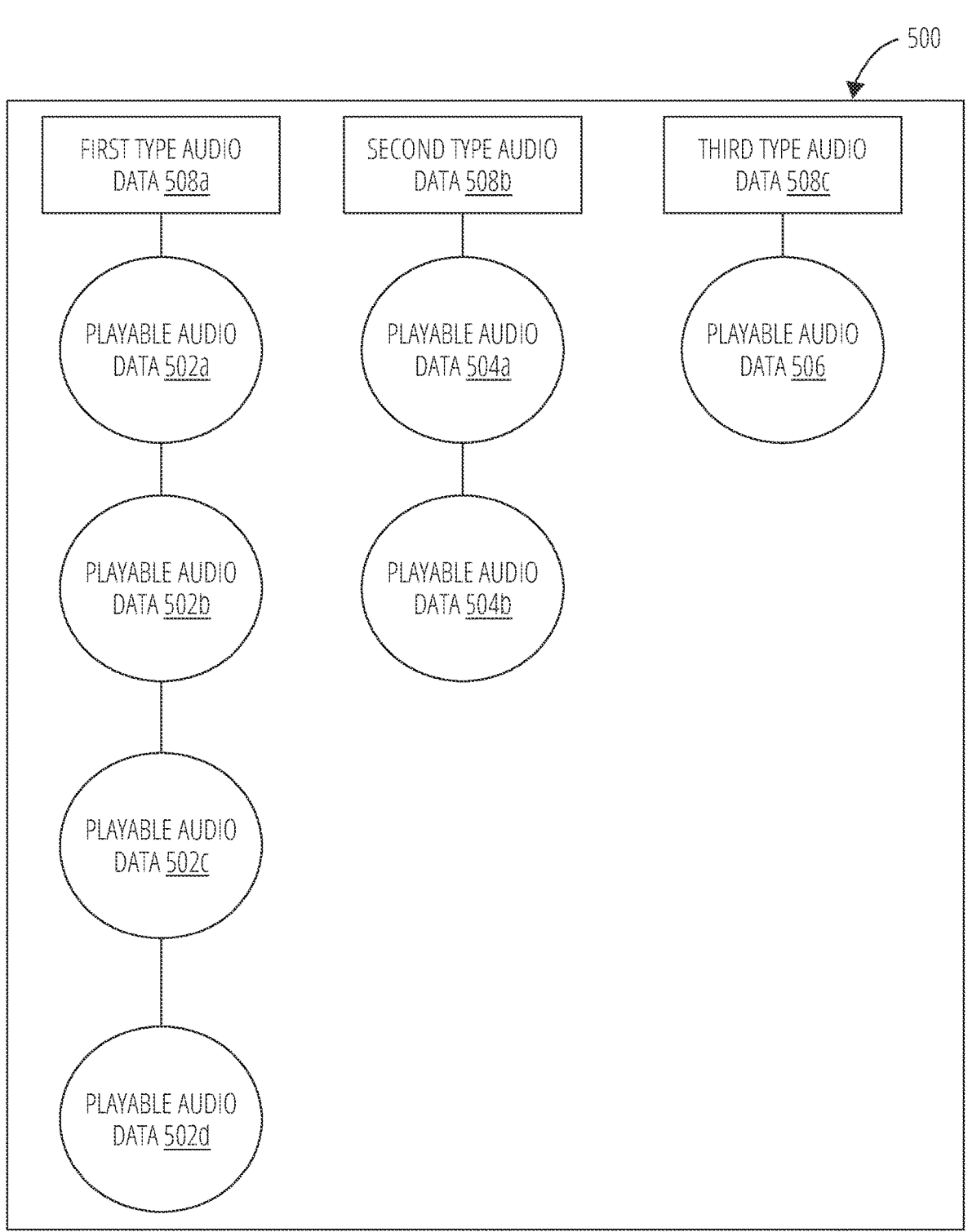
FIG. 5 illustrates a visualization of an example set of playable audio data in accordance with at least one example embodiment of the present disclosure.

FIG. 5 illustrates a visualization of an example set of playable audio data in accordance with at least one example embodiment of the present disclosure. Specifically, FIG. 5 depicts an example set of playable audio data 500. The example set of playable audio data 500 includes a plurality of portions of playable audio data, the plurality of portions of playable audio data include different types of playable audio data. It will be appreciated that, in other embodiments, a set of playable audio data a=may include any other number of portions of playable audio data, and/or may include any number of different types of playable audio data.

As depicted, set of playable audio data 500 includes three types of distinct types of audio data, specifically first type audio data 508*a*, second type audio data 508*b*, and third type audio data 508*c*. The first type audio data 508*a* includes portions of playable audio data including playable audio data 502*a*-502*d*. The second type audio data 508*b* includes portions of playable audio data including playable audio data 504*a*-504*b*. The third type audio data 508*c* includes portions of playable audio data including only playable audio data 506. In some embodiments, the different types of playable audio data correspond to different classifications of the audio data embodied in that particular portion of playable audio data. For example, in one example context, first type audio data 508*a* represents music audio data, second type audio data 508*b* represents announcement audio data, and third type audio data 508*c* represents advertisement audio data.

In some embodiments, a set of playable audio data is created including data indicating the type of each particular playable audio data in the set. For example, in some embodiments, a user of an authorized control device selects or otherwise provides user input indicating a type of a particular playable audio data as the particular playable audio data is added to a set of playable audio data at the authorized control device. Such data may be propagated together with the playable audio data itself during transmission and/or forwarding of the set of playable audio data to an intermediary device and/or subsequently to an onboard vehicle system as depicted and described herein.

In some embodiments, a set of playable audio data is defined with an initial sequence that arranges the portions of playable audio data for output. In some embodiments, the sequence is set by a user during creation of the set of playable audio data via an authorized control device, for example. In other embodiments, the sequence is automatically set, for example by integrating a particular type of playable audio data at every X position in the sequence, where X is a number, or utilizing another determinable formula. Additionally or alternatively, in some embodiments, a user may alter or navigate through the sequence set of playable audio data via an onboard vehicle system, for example.

Figure 6:
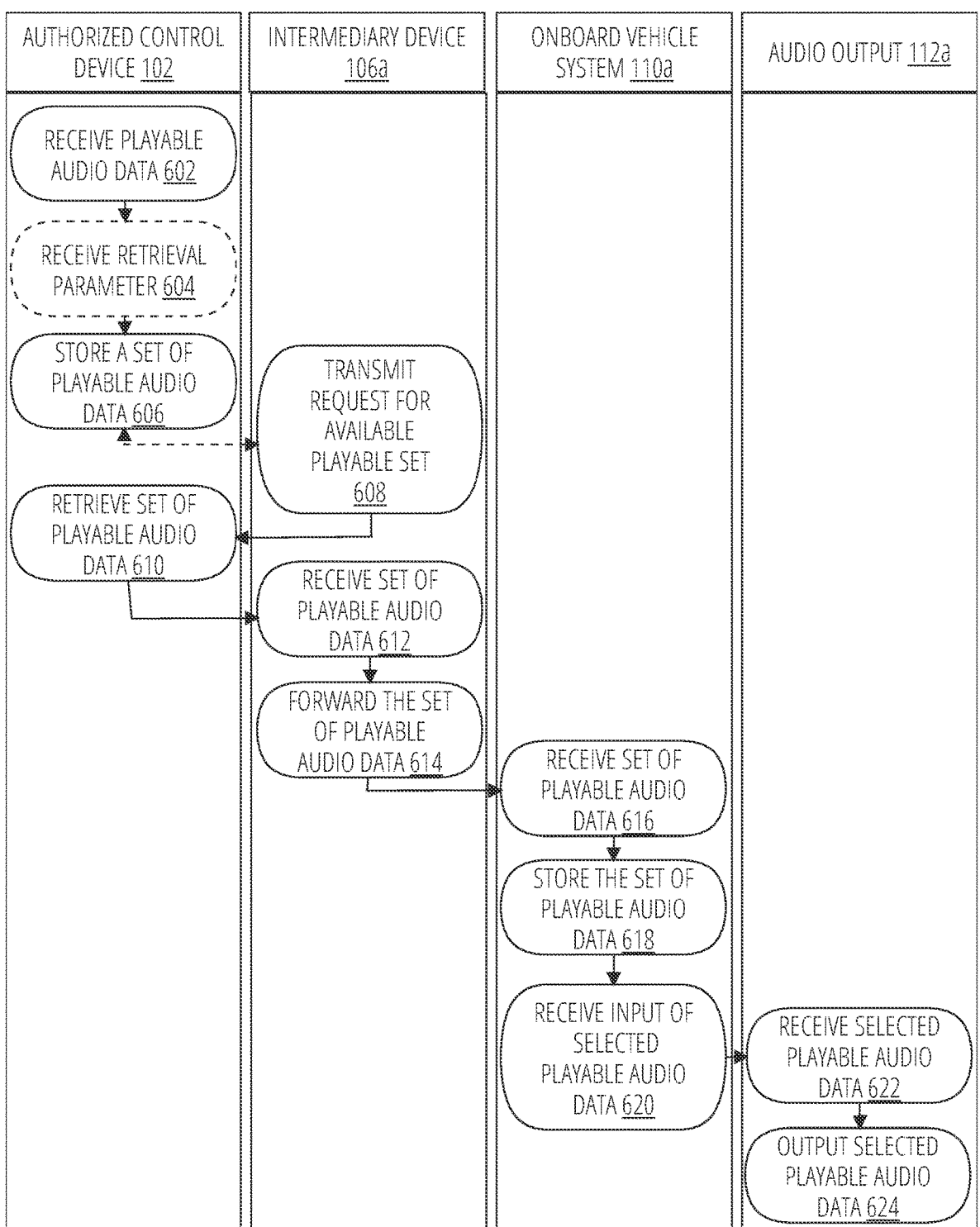
FIG. 6 illustrates an example data flow for outputting particular playable audio data in accordance with at least one example embodiment of the present disclosure.

FIG. 6 illustrates an example data flow for outputting particular playable audio data in accordance with at least one example embodiment of the present disclosure. Specifically, FIG. 6 depicts a data flow performed by the various components of the system 100, including authorized control device 102, intermediary device 106*a*, onboard vehicle system 110*a*, and audio output 112*a*. In this regard, the various devices may interact over one or more communications networks to perform the particular data flow for outputting particular playable audio data from a created set of playable audio data.

The data flow begins at operation 602. The operation 602 may begin upon initiation of creation or modification of a set of playable audio data at operation 602. At operation 602, the authorized control device 102 receives playable audio data. In some embodiments, the playable audio data is embodied by an audio file, where the audio file defines a portion of playable audio data. Additionally or alternatively, in some embodiments, the playable audio data is received together with one or more additional portions of metadata associated with the portion of playable audio data, for example a type of the playable audio data, filename data, and/or the like. In some embodiments, playable audio data is received at the authorized control device 102 in response to user input, for example directly to the authorized control device 102 or user input provided by a corresponding administrator user device. It should be appreciated that the operation 602 may be repeated for any number of portions of playable audio data.

At optional operation 604, the authorized control device 102 receives at least one retrieval parameter. In some such embodiments, the retrieval parameter is associated with one or more portions of playable audio data received at operation 602. The retrieval parameter includes a data identifier and/or other information that uniquely represents or otherwise is associated with the one or more portions of playable audio data, for example such that the retrieval parameter is usable to retrieve the particular portions of playable audio data received at operation 602. In some embodiments, the retrieval parameter is to be associated with a created set of playable audio data that includes the playable audio data received at operation 602. In some embodiments, the retrieval parameter is received in response to user input provided directly to the 102 or provided by a corresponding administrator user device. It should be appreciated that optional operation 604 may be repeated for any number of retrieval parameters to be associated with a particular se of playable audio data.

At operation 606, the authorized control device 102 stores a set of playable audio data. In some embodiments, the authorized control device 102 stores the set of playable audio data to a memory of or otherwise accessible to the authorized control device 102. In this regard, the set of playable audio data may be subsequently retrievable from the authorized control device 102, for example to transmission to one or more intermediary device as described herein.

In some embodiments, the set of playable audio data embodies one or more data structures including all portions of playable audio data received at operation 602. In some such embodiments, the portions of playable audio data of the set of playable audio data are arranged in a particular sequence that defines a default order of the portions of playable audio data in the set of playable audio data. Additionally or alternatively, in some embodiments, the set of playable audio data is stored together with the at least one retrieval parameter, for example such that the at least one retrieval parameter is usable as a key to retrieve the set of playable audio data from the authorized control device 102. Once a set of playable audio data is stored by the authorized control device 102, it may be made available for transmission to one or more intermediary devices, for example automatically upon storage of the set of playable audio data, detection of a particular data-driven trigger (e.g., a particular time, device at a particular location, and/or the like), and/or upon request from the one or more intermediary device.

Independently from operation 606, at operation 608, an intermediary device such as the intermediary device 106*a* as depicted transmits a request for an available playable set. In some embodiments, the intermediary device 106*a* accesses the authorized control device 102 to receive a list of available playable sets. For example, the intermediary device 106*a* may connect to the authorized control device 102 and receive data indicating the available playable sets stored to the authorized control device 102, and render a corresponding user interface that enables the user to select a particular set from the available playable sets. Each available playable set may be linked to particular data received from the authorized control device 102 together with such an available playable set, where the data represents the particular retrieval parameters associated with that particular available playable set. Upon interaction with the user interface and/or other selection of a particular available playable set, the intermediary device 106*a* may generate a request that indicates the particular selected available playable set. For example, in some embodiments the intermediary device 106*a* generates a request including data representing at least one requested parameter based on the selection by the user, where the requested parameter data corresponds to the retrieval parameter(s) corresponding to the selected available playable set for retrieval.

In some embodiments, the intermediary device 106*a* provides notification-based updating functionality of content stored via to the intermediary device, for example for storage of one or more sets of playable audio data. For example, in some embodiments, the authorized control device 102 transmits a notification to the intermediary device 106*a* indicating that a new set of playable audio data is available for download, or that an existing set of playable audio data stored to the intermediary device 106*a* has been updated. In some embodiments, the authorized control device 102 maintains data indicating which intermediary devices are subscribed to or otherwise should receive notifications for particular sets of playable audio data. Additionally or alternatively, in some embodiments, an intermediary device—such as the intermediary device 106*a*—notifies the authorized control device 102 of which sets of playable audio data are relevant to that particular intermediary device. In this regard, the intermediary device 106*a* is made aware via any such notification(s) of which sets of playable audio data are new or otherwise have received updates that require downloading to the intermediary device and/or pushing to a corresponding onboard vehicle system.

The intermediary device 106*a* then transmits the request to the authorized control device 102 for processing. In some embodiments, the request is transmitted upon user input initiating transmission of the request. Additionally or alternatively, in some embodiments the request is transmitted upon initiation of any other data-driven trigger detected by the intermediary device 106*a*. Additionally or alternatively, in some embodiments, the operation 608 is optional, such that retrieval of a particular set of playable audio data may occur automatically by the authorized control device 102 and/or otherwise without requesting from the particular intermediary device, such as the intermediary device 106a. In some embodiments, user credentials are submitted, where the user credentials are linked to a particular authenticated user account. Particular sets of playable audio data may be made available to, or otherwise linked to, the authenticated user account such that these sets of playable audio data can be retrieved utilizing said account.

At operation 610, the authorized control device 102 retrieves a particular set of playable audio data. In some embodiments, the authorized control device 102 retrieves the set of playable audio data in response to receiving the request transmitted at operation 608. In some embodiments, the authorized control device 102 retrieves a particular set of playable audio data based at least in part on data from the request. For example, in some embodiments, the authorized control device 102 parses at least one requested parameter from the request, and processes the requested parameter to identify and retrieve a set of playable audio data corresponding to at least one retrieval parameter that matches the at least one requested parameter. The authorized control device 102 may retrieve the set of playable audio data from a database or other memory storage of or otherwise accessible to the authorized control device 102. For example, in some embodiments, the authorized control device 102 retrieves the set of playable audio data earlier created and stored to the authorized control device 102, for example at operation 606.

In some embodiments, upon retrieving the set of playable audio data, the authorized control device 102 transmits the retrieved set of playable audio data to the intermediary device 106a for further processing. In some embodiments, the retrieved set of playable audio data is transmitted as a response to the request from the intermediary device 106a. At operation 612, the intermediary device 106a receives the set of playable audio data. In some embodiments, the intermediary device 106a receives the set of playable audio data over a wireless communications network, such that the set of playable audio data may be updated as received by the intermediary device 106a from any of a myriad of multiple locations without requiring direct, wired access to the authorized control device 102.

In some embodiments, the authorized control device 102 transmits only changes to an existing set of playable audio data to the intermediary device 106a. For example, in a circumstance where the intermediary device 106a includes an out-of-date version of a particular set of playable audio data that was updated via the authorized control device 102, the authorized control device 102 may provide only the altered portions of the set of playable audio data to the intermediary device 106a. In some such embodiments, the intermediary device 106a may include data indicating the existing configuration of the set of playable audio data to be updated to the authorized control device 102, for example in the transmitted request, for use in identifying the changes to be performed to the existing set of playable audio data stored by the intermediary device 106a.

In some embodiments, the intermediary device 106a stores the set of playable audio data received from the authorized control device 102. In some embodiments, the intermediary device 106a stores the received set of playable audio data to a memory of or accessible to the intermediary device 106a. The storage may be a permanent storage, database, and/or the like that facilitates long-term storage of the set of playable audio data for future use. In this regard, the intermediary device 106a may store the received set of playable audio data until a request or indication is received to forward the set of playable audio data to an onboard vehicle system. Alternatively, in some embodiments, the intermediary device 106a only temporarily stores the set of playable audio data for immediate forwarding of the set of playable audio data to a corresponding onboard vehicle system.

At operation 614, the intermediary device 106a forwards the set of playable audio data to a particular onboard vehicle system, for example onboard vehicle system 110a. In some embodiments, the intermediary device 106a is connected to the onboard vehicle system 110a via a wireless communications network. The wireless communications network may be the same as the wireless communications network that facilitated transmission of the set of playable audio data from the authorized control device 102, or may embody a wholly or partially distinct wireless communications network. In some embodiments, the user of the intermediary device 106a selects a particular communications network to connect to, for example embodying an onboard vehicle Wi-Fi system, and connects to the onboard vehicle system corresponding to that wireless communications network.

In some embodiments, the intermediary device 106a forwards the set of playable audio data automatically and/or in response to a detected data-driven event. For example, in some embodiments, the intermediary device 106a initiates forwarding of the set of playable audio data in response to detecting connection to a particular wireless communications network corresponding to an onboard vehicle system. Additionally or alternatively, in some embodiments, the intermediary device 106a detects entrance into a particular location geofence, and initiates forwarding of the set of playable audio data in response to such detection. Additionally or alternatively, in some embodiments, the intermediary device 106a receives user input that indicates a request to initiate forwarding of the set of playable audio data to a particular onboard vehicle system. For example, in some embodiments the intermediary device 106a provides a user interface indicating connected and/or available onboard vehicle systems with which the intermediary device 106a may communicate and/or sets set of playable audio data available to the intermediary device 106a for transfer. A user of the intermediary device 106a may provide user input by interacting with the user interface to initiate forwarding of the set of playable audio data to the onboard vehicle system 110a. For example, in one example context, the intermediary device 106a embodies tablets provided to flight attendants that, upon connecting to an onboard vehicle Wi-Fi, can upload a set of playable audio data stored on or otherwise available via the tablet from the authorized control device 102 to an onboard vehicle system of an aerial vehicle.

At operation 616, the onboard vehicle system 110a receives the set of playable audio data. In some embodiments, the onboard vehicle system 110a receives the set of playable audio data over a particular wireless communications network connecting the onboard vehicle system 110a with at least one intermediary device 106a.

At operation 618, the onboard vehicle system 110a stores the set of playable audio data. In some embodiments, the onboard vehicle system 110a stores the set of playable audio data to at least one memory of the onboard vehicle system 110a. The set of playable audio data is stored such that it is retrievable for use in generating at least one user interface for initiating output of at least one portion of playable audio data from the set of playable audio data. For example, in some embodiments, the onboard vehicle system 110a renders, to a display of the onboard vehicle system 110a, a user interface including an interface element for each portion of playable audio data in the set of playable audio data, where interaction with the interface element provides user input that represents a selected playable audio data for outputting.

In some embodiments, the set of playable audio data is defined as unalterable at the onboard vehicle system 110*a*. In this regard, the set of playable audio data may be processed to initiate output of particular portions of the playable audio data, for example, but may not be adjusted or otherwise changed (e.g., added to or removed from) by the users of the onboard vehicle system 110*a* or associated intermediary device 106*a*. Instead, the set of playable audio data in some such embodiments is only definable by users of the authorized control device 102, for example administrators via corresponding administrator user device(s).

At operation 620, the onboard vehicle system 110*a* receives input of selected playable audio data. In some embodiments, the user engages a particular interface element of a user interface outputted via the onboard vehicle system 110*a* to cause the onboard vehicle system 110*a* to receive user input corresponding to that interface element. The user input may correspond to and/or otherwise indicate the selected playable audio data from the set of playable audio data. Alternatively or additionally, in some embodiments the onboard vehicle system 110*a* receives user input that triggers outputting of a selected playable audio data representing the first portion of playable audio data in a sequence defined of the set of playable audio data. Upon receiving the input of the selected playable audio data, in some embodiments the onboard vehicle system 110*a* triggers outputting of the selected playable audio data via at least one audio output, for example at least the audio output 112*a*.

In some embodiments, the onboard vehicle system 110*a* includes a display that facilitates output of the user interface and/or receiving of user input. Additionally or alternatively, in some embodiments, an intermediary device connected to or otherwise associated with the onboard vehicle system is utilized to control the audio playback performed via the onboard vehicle system. For example, a connected intermediary device may include one or more displays configured to enable rendering or other outputting of a user interface that, in response to user input, receives a selected playable audio data from a particular set of playable audio data, receives a particular volume level or other setting utilized for outputting the selected playable audio data, and/or the like. In some embodiments, any number of intermediary devices may be connected to or otherwise associated with controlling a particular onboard vehicle system at a given time. In one example context of air travel, an aircraft including the onboard vehicle system may be controlled by at least one flight attendant via a central user interface displayed via a fixed onboard computing device of the aircraft, and/or via a tablet possessed by a given flight attendant where the tablet is communicatively coupled with the onboard vehicle system over the aircraft's onboard Wi-Fi.

At operation 622, the audio output 112*a* receives the selected playable audio data. For example, in some embodiments, the onboard vehicle system 110*a* is directly coupled with the audio output 112*a*. In this regard, in some embodiments, the onboard vehicle system 110*a* transmits the selected playable audio data to the audio output 112*a* via a wired communications network, such that the audio signals of the selected playable audio data are propagated via the connection to the audio output 112*a*. In some embodiments, the particular parameters of the signals embodying the selected playable audio data are controlled by the onboard vehicle system 110*a*, for example the volume of the playable audio data, the particular portion or timestamp of data in the selected playable audio data to be outputted, and/or the like.

At operation 624, audio output 112*a* outputs the selected playable audio data. For example, in some embodiments, the audio output 112*a* embodies or includes a speaker that, upon receiving signals representing the selected playable audio data from the onboard vehicle system 110*a*, generates the audio into an environment such that it may be listened to by one or more users in that environment. For example, the audio output 112*a* may include or embody a speaker built into the chassis of the vehicle, an audio jack or other connection that facilitates access via a headset or other peripheral audio output, and/or the like. It should be appreciated that multiple audio outputs may be connected to the onboard vehicle system 110*a* to enable output via any and/or all of such audio outputs simultaneously.

Example Processes of the Disclosure

Having described example systems, apparatuses, data architectures, and data flows in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 7 illustrates a flowchart including operations of an example computer-implemented process in accordance with at least one example embodiment of the present disclosure. Specifically, FIG. 7 depicts operations of an example process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the apparatus 400 alone or in communication with one or more other component(s), device(s), system(s), and/or the like. In this regard, in some such embodiments, the apparatus 400 is specially configured by computer-coded instructions (e.g., computer program instructions) stored thereon, for example in the memory 404 and/or another component depicted and/or described herein and/or otherwise accessible to the apparatus 400, for performing the operations as depicted and described. In some embodiments, the apparatus 400 is in communication with one or more external apparatus(es), system(s), device(s), and/or the like, to perform one or more of the operations as depicted and described. For example, the apparatus 400 in some embodiments is in communication with at least one apparatus, at least one physical component, at least one audio output, intermediary device, and/or the like. For purposes of simplifying the description, the process 700 is described as performed by and from the perspective of the apparatus 400.

Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

According to some examples, the method includes receiving, at an onboard vehicle system of a vehicle and via a wireless communications network, a set of playable audio data from an intermediary device at operation 702. According to some examples, the set of playable audio data is unalterable by the onboard vehicle system and the intermediary device. For example, the set of playable audio data may be received from an intermediary device over the wireless network, where the intermediary device forwards the playable audio data from an authorized control device. The set of playable audio data in some such embodiments may only be alterable via the authorized control device.

According to some examples, the method includes storing the set of playable audio data at operation 704. The stored set of playable audio data may be interactable via the onboard vehicle system, for example via one or more user interfaces rendered to displays of the onboard vehicle system that enable selection of a particular portion of playable audio data for outputting.

According to some examples, the method includes causing outputting of at least one playable audio data of the set of playable audio data via at least one audio output of the vehicle at operation 706. In some embodiments, the at least one audio output is directly coupled to the onboard vehicle system. In this regard, the onboard vehicle system may transmit signals embodying a selected playable audio data of the set of playable audio data via one or more wired communications networks (e.g., audio cables connecting the audio output and the onboard vehicle system) to cause outputting of audio. In some embodiments, the at least one audio output embodies a subcomponent of the onboard vehicle system.

Figure 8:
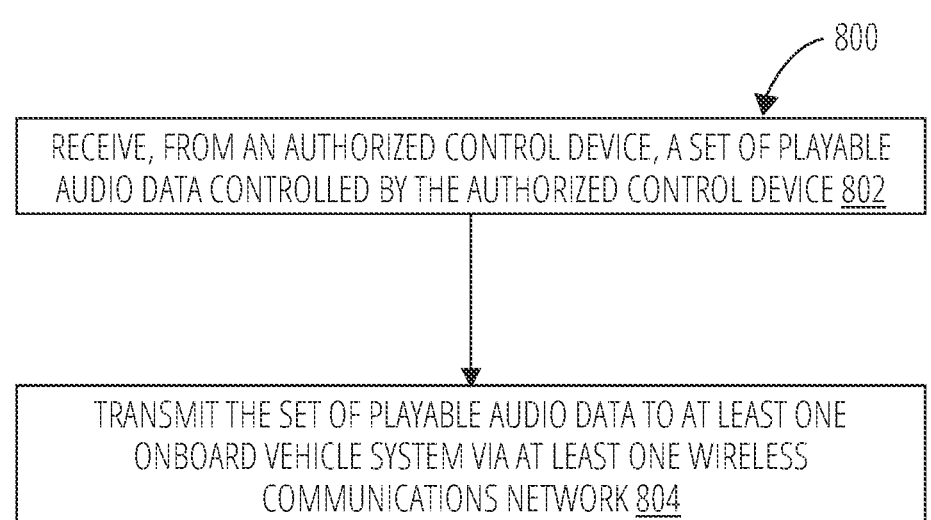
FIG. 8 illustrates a flowchart including operations of an example computer-implemented process in accordance with at least one example embodiment of the present disclosure.

FIG. 8 illustrates a flowchart including operations of an example computer-implemented process in accordance with at least one example embodiment of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the apparatus 300 alone or in communication with one or more other component(s), device(s), system(s), and/or the like. In this regard, in some such embodiments, the apparatus 400 is specially configured by computer-coded instructions (e.g., computer program instructions) stored thereon, for example in the memory 304 and/or another component depicted and/or described herein and/or otherwise accessible to the apparatus 300, for performing the operations as depicted and described. In some embodiments, the apparatus 300 is in communication with one or more external apparatus(es), system(s), device(s), and/or the like, to perform one or more of the operations as depicted and described. For example, the apparatus 300 in some embodiments is in communication with at least one apparatus, at least one physical component, at least one authorized control device, onboard vehicle system, and/or the like. For purposes of simplifying the description, the process 800 is described as performed by and from the perspective of the apparatus 300.

Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

According to some examples, the method includes receiving, from an authorized control device, a set of playable audio data controlled by the authorized control device at operation 802. In this regard, in some embodiments, the set of playable audio data is unalterable by the device that receives it, such as the apparatus 300. In some embodiments, the set of playable audio data is received based at least in part on at least one retrieval parameter. For example, in some embodiments the set of playable audio data is received in response to a request transmitted by the apparatus 300 to the authorized control device, for example where the request includes the at least one retrieval parameter.

According to some examples, the method includes transmitting the set of playable audio data to at least one onboard vehicle system via at least one wireless communications network at operation 804. In some embodiments, the apparatus 300 transmits the set of playable audio data to forward the set of playable audio data to the onboard vehicle system for further processing. For example, in some embodiments, the onboard vehicle system is configured to output at least one playable audio data of the set of playable audio data via at least one audio output directly coupled to the onboard vehicle system. In some embodiments, the apparatus 300 connects with the at least one onboard vehicle system via the wireless communications network in response to user input. For example, in some embodiments the apparatus 300 renders a user interface depicting onboard vehicle system(s) with which the apparatus 300 can connect, and/or available wireless communications networks that are each associated with an onboard vehicle system. Additionally or alternatively, in some embodiments the apparatus 300 renders a user interface depicting stored sets set of playable audio data. In this regard, the user may provide user input associated with interface elements of such user interfaces to initiate the transfer of a particular set of playable audio data to a particular onboard vehicle system.

FIG. 9 illustrates a flowchart including operations of an example computer-implemented process in accordance with at least one example embodiment of the present disclosure. Specifically, FIG. 9 depicts operations of an example process 900. In some embodiments, the process 800 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one apparatus, at least one physical component, at least one intermediary device, and/or the like. For purposes of simplifying the description, the process 800 is described as performed by and from the perspective of the apparatus 200.

Although the example process 900 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 900 may perform functions at substantially the same time or in a specific sequence.

According to some examples, the method includes receiving, from an authorized control device, a set of playable audio data at operation 902. In some embodiments, the set of playable audio data is received in response to user input. The user input may represent uploads of any number of portions of playable audio data, and/or indicate locations of playable audio data to be included in a set of playable audio data.

According to some examples, the method includes storing the set of playable audio data associated with at least one retrieval parameter at operation 904. In some embodiments, upon storing the set of playable audio data, the set of playable audio data is made available as an available playable set for forwarding via at least one intermediary device. Additionally or alternatively, in some embodiments, the set of playable audio data is stored associated with one or more retrieval parameter associated with the set of playable audio data. In some embodiments, the at least one retrieval parameter is received in response to user input via the apparatus 200. Additionally or alternatively, in some embodiments at least one retrieval parameter is automatically assigned, for example based at least in part on statically identified data, based at least in part on processing metadata and/or content of one or more portions of playable audio data of the set, and/or the like.

According to some examples, the method includes receiving, from at least one intermediary device, a request for playable audio data at operation 906. The request in some embodiments is received over a wireless communications network, enabling updating of the set of playable audio data to the at least one intermediary device from a myriad of locations. In some embodiments, the request includes at least one requested parameter, for example inputted by a user of the intermediary device.

According to some examples, the method includes determining that the at least one requested parameter matches the at least one retrieval parameter at operation 908. In some embodiments, for example, each set of playable audio data is stored associated with at least one retrieval parameter embodying a key for retrieval. The apparatus 200 may compare the at least one requested parameter with the at least one retrieval parameter for one or more stored sets set of playable audio data to retrieve the set of playable audio data that matches the requested parameter(s).

In response to determining that the at least one requested parameter matches the at least one retrieval parameter, for example at operation 910, the apparatus 200 may perform one or more subsequent operations. For example, in some embodiments, the apparatus 200 performs operations operation 912 and operation 914 in response.

According to some examples, the method includes retrieving the set of playable audio data at operation 912. In some embodiments, the apparatus 200 retrieves the set of playable audio data associated with at least one retrieval parameter matching the at least one requested parameter from a database or other storage accessible to the apparatus 200.

According to some examples, the method includes transmitting the set of playable audio data to the at least one intermediary device at operation 914. In some embodiments, the set of playable audio data is transmitted via a wireless communications network. Additionally or alternatively, in some embodiments, the set of playable audio data is not directly alterable via any of the at least one intermediary device. In some embodiments, the at least one intermediary device is configured to forward, via at least one wireless communications network, the set of playable audio data to an onboard vehicle system. The at least one wireless communications network may be the same as the wireless communication network utilized to access the apparatus 200, or may embody a distinct wireless communications network. In some embodiments, the intermediary device forwards the set of playable audio data to cause the onboard vehicle system to output at least one playable audio data of the at least one playable audio data via at least one audio output directly coupled to the onboard vehicle system, for example as described herein with respect to FIGS. 8 and 7.

Example Processes of the Disclosure

Having described example systems, apparatuses, data architectures, data flows, and processes in accordance with the disclosure, example user interfaces of the disclosure will now be discussed. It will be appreciated that each of the user interfaces may be rendered by a particular device of the example systems and/or apparatuses described herein, for example by at least one of the apparatuses 200, 300, and/or 400 as depicted and described herein. The user interfaces may initiate or otherwise facilitate initiation of the functionality described herein.

Figure 10:
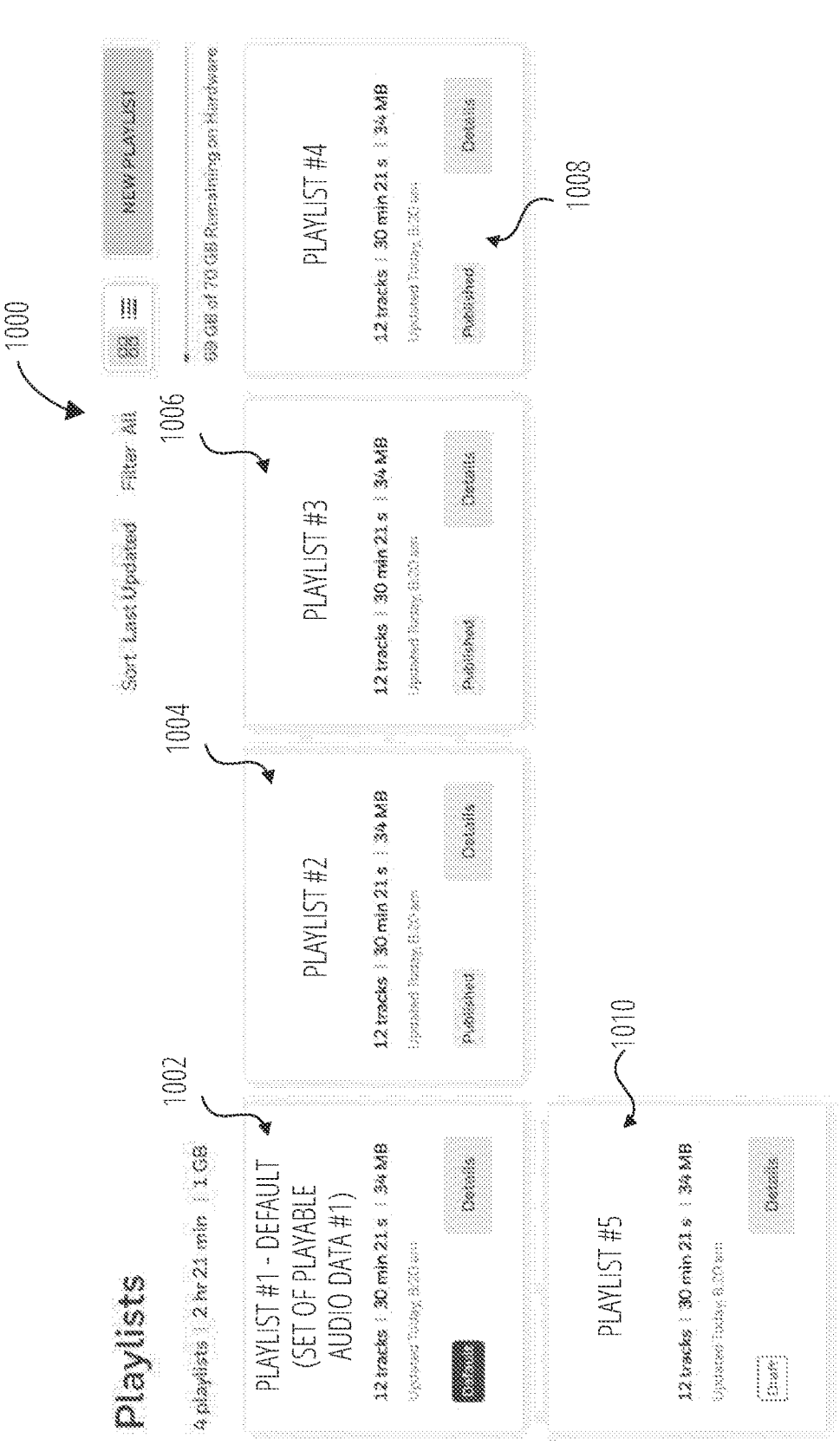
FIG. 10 illustrates an example user interface for enabling updating of at least one set of playable audio data via an authorized control device in accordance with at least one example embodiment of the present disclosure.

FIG. 10 illustrates an example user interface for enabling updating of at least one set of playable audio data via an authorized control device in accordance with at least one example embodiment of the present disclosure. Specifically, FIG. 10 depicts an example user interface 1000. In some embodiments, the user interface 1000 is rendered via the apparatus 200 embodying an example authorized control device 102.

As depicted, the user interface 1000 includes any number of interface elements corresponding to sets of playable audio data stored via the apparatus 200 For example, the user interface 1000 includes audio set element 1002, audio set element 1004, audio set element 1006, audio set element 1008, and audio set element 1010, each corresponding to a different set of playable audio data. In some embodiments, the user of the apparatus 200 may interact with any one of the audio set elements to configure particular data of and/or associated with the corresponding set of playable audio data. For example, in some embodiments, the user may interact with a particular audio set element 1002 to set a particular set of playable audio data as default, delete a particular set of playable audio data, and/or adjust portions of playable audio data in the set of playable audio data. In some embodiments, only a subset of users permissioned as administrators are able to alter data associated with a particular set of playable audio data. In some embodiments, for example, particular user input with a particular audio set element triggers navigation to the user interface 1100 as depicted and described herein with respect to FIG. 11.

FIG. 11 illustrates an example user interface for updating playable audio data of a set of playable audio data via an authorized control device in accordance with at least one example embodiment of the present disclosure. Specifically, FIG. 11 depicts an example user interface 1100. In some embodiments, the user interface 1100 is rendered via the apparatus 200 embodying an example authorized control device 102.

The user interface 1100 is configured to depict interface elements representing each portion of playable audio data of a particular set of playable audio data, and/or interface elements for managing such portions of playable audio data. The user interface 1100 includes a set of playable audio data elements 1102. Each interface element of the set of playable audio data elements 1102 includes a representation of a particular, distinct portion of playable audio data included in the set of playable audio data. In this regard, the user may interact with a particular interface element of the set of playable audio data elements 1102 to manage data associated with a particular portion of playable audio data, for example to remove it from the set of playable audio data, change its position in the set of playable audio data, and/or the like. Additionally or alternatively, in some embodiments the user interface 1100 includes at least one interface element that enables adding of a new portion of playable audio data to the set of playable audio data.

In some embodiments, each portion set of playable audio data is associated with a particular type of audio data. The user interface 1100 includes any number of filter elements for altering the depictions in the set of playable audio data elements 1102 to a particular type of audio data. For example, as illustrated, the user interface 1100 includes type filter element 1104, type filter element 1106, and type filter element 1108. In some such embodiments, the type filter element 1104 enables filtering of the set of playable audio data elements 1102 to include only portions of playable audio data of a music audio type. The type filter element 1106 enables filtering of the set of playable audio data elements 1102 to include only portions of playable audio data of an advertisement audio type. The type filter element 1108 enables filtering of the set of playable audio data elements 1102 to include only portions of playable audio data of an announcement audio type. Such interface elements may enable a user to efficiently interact with particular portions of playable audio data of particular audio data types.

FIG. 12 illustrates an example user interface for preparing to initiate update of a set of playable audio data via an intermediary device in accordance with at least one example embodiment of the present disclosure. Specifically, FIG. 12 depicts an example user interface 1200. In some embodiments, the user interface 1200 is rendered via the apparatus 300 embodying an example intermediary device, for example intermediary device 106a. In some embodiments, the user interface 1200 is rendered to the apparatus upon receiving of an indication of an updated set of playable audio data from an authorized control device, for example automatically in response to an update performed at the authorized control device or in response to a request initiated via the apparatus 300 for the latest set of playable audio data.

The user interface 1200 includes set update status element 1202. The set update status element 1202 indicates a current status of a download of a set of playable audio data from the authorized control device. In this regard, the set update status element 1202 may update as portions of playable audio data embodying a set of playable audio data are received from the corresponding authorized control device and stored to the apparatus 300. In some embodiments, the apparatus 300 redownloads an entire set of playable audio data. In other embodiments, the apparatus 300 downloads changes from an existing set of playable audio data to update that set of playable audio data on the apparatus 300.

The user interface 1200 further includes a transfer process element 1204. In some embodiments, user input with the transfer process element 1204 begins a process for initiating forwarding of the set of playable audio data downloaded from the authorized control device to at least one onboard vehicle system. In some embodiments, user input with the transfer process element 1204 triggers transition to the user interface 1300 as depicted and described herein with respect to FIG. 13.

Figure 13:
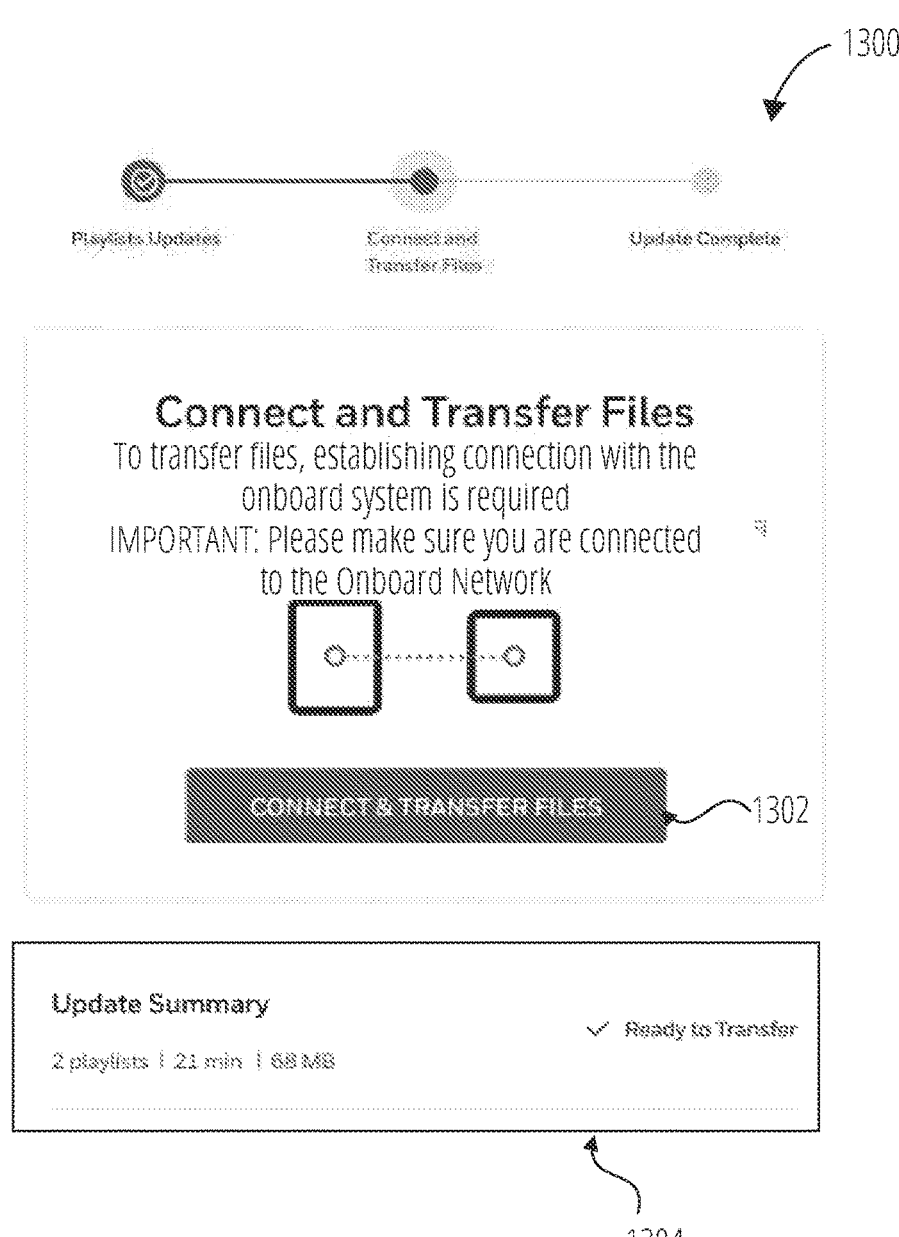
FIG. 13 illustrates an example user interface for initiating update of a set of playable audio data via an intermediary device in accordance with at least one example embodiment of the present disclosure.

FIG. 13 illustrates an example user interface for initiating update of a set of playable audio data via an intermediary device in accordance with at least one example embodiment of the present disclosure. Specifically, FIG. 13 depicts an example user interface 1300. In some embodiments, the user interface 1300 is rendered via the apparatus 300 embodying an example intermediary device, for example intermediary device 106a.

The user interface 1300 includes initiate transfer element 1302. The initiate transfer element 1302 is configured to receive user input that triggers forwarding of a set of playable audio data to at least one onboard vehicle system. The onboard vehicle system in some embodiments is predetermined by the apparatus 300, or otherwise preselected by a user. In this regard, in some embodiments the apparatus 300 is connected to a wireless communications network that enables communication with the onboard vehicle system embodied by at least one computing system onboard a particular vehicle, for example a computing system onboard a plane or other aerial vehicle.

The user interface 1300 further includes transfer status element 1304. The transfer status element 1304 indicates a current status of forwarding of a set of playable audio data to the onboard vehicle system. For example as illustrated, the transfer status element 1304 may depict that a transfer of the set of playable audio data is ready before user input engaging the initiate transfer element 1302. Upon user input with the initiate transfer element 1302, the transfer status element 1304 may update to indicate a particular percentage of the set of playable audio data that was successfully forwarded to the onboard vehicle system, and/or related data associated with a transfer to the onboard vehicle system. Additionally or alternatively, the transfer status element 1304 may dynamically update to indicate completion of the forwarding of the set of playable audio data once all portions of playable audio data have been successfully transferred.

FIG. 14 illustrates an example user interface indicating completion of an update of a set of playable audio data via an intermediary device in accordance with at least one example embodiment of the present disclosure. Specifically, FIG. 14 depicts an example user interface 1400. In some embodiments, the user interface 1400 is rendered via the apparatus 300 embodying an example intermediary device, for example intermediary device 106*a*. The user interface 1400 depicts a completion interface indicating that forwarding of a set of playable audio data to an onboard vehicle system was completion. For example, the user interface 1400 may represent a final dynamic version of the user interface 1300 upon successful transfer of all portions of playable audio data of a set of playable audio data, or successful transfer of changes to a set of playable audio data already stored via an onboard vehicle system.

Figure 15:
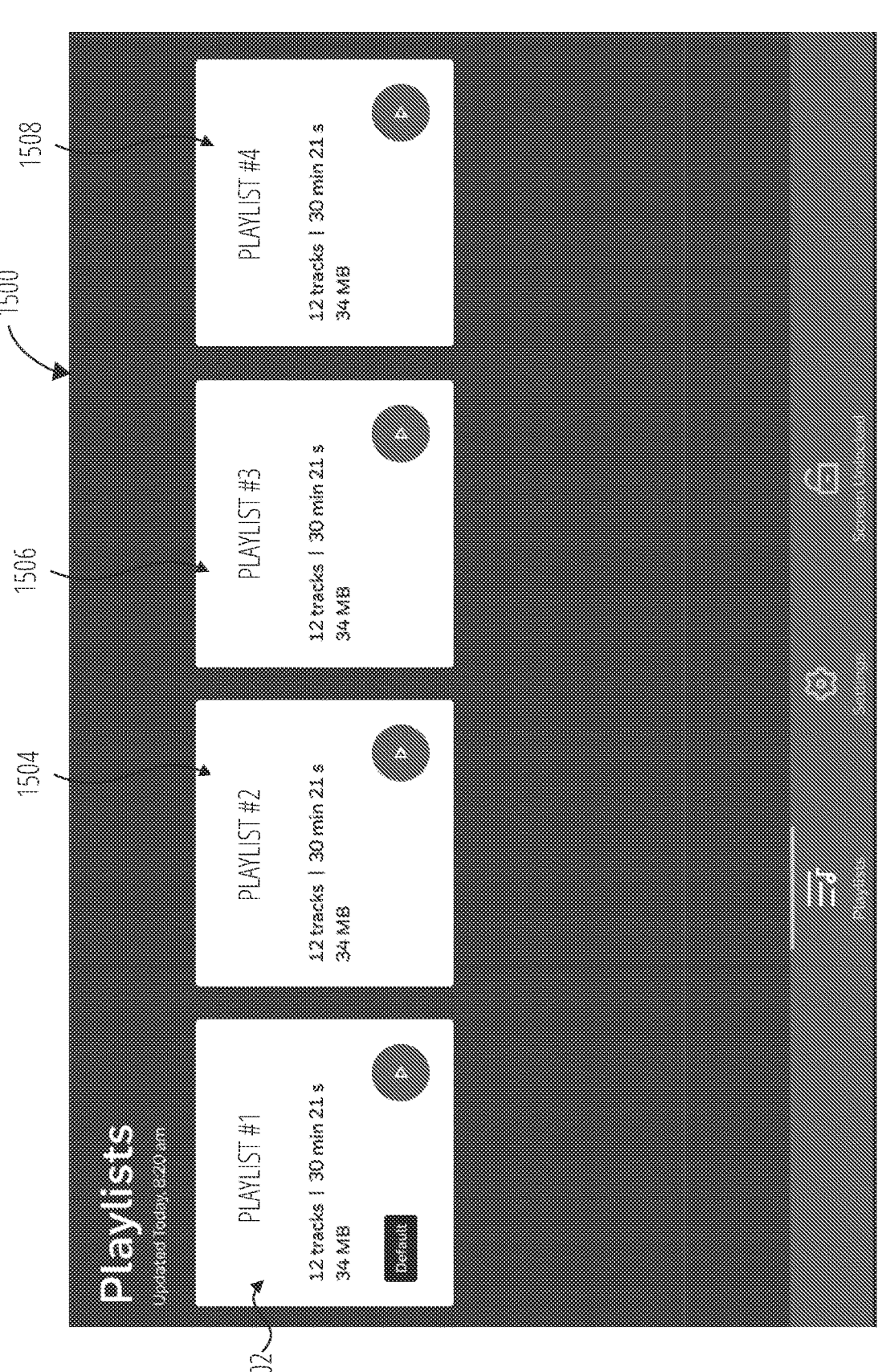
FIG. 15 illustrates an example user interface for selecting a particular selected playable audio data from a set of multiple sets of playable audio data via an onboard vehicle system in accordance with at least one example embodiment of the present disclosure.

FIG. 15 illustrates an example user interface for selecting a particular selected playable audio data from a set of multiple sets of playable audio data via an onboard vehicle system in accordance with at least one example embodiment of the present disclosure. Specifically, FIG. 15 depicts an example user interface 1500. In some embodiments, the user interface 1500 is rendered via the apparatus 400 embodying an example onboard vehicle system, for example onboard vehicle system 110*a*.

In some embodiments, control of an onboard vehicle system is performed by one or more other computing devices. For example, in some embodiments, an onboard vehicle system is controllable via one or more connected intermediary devices. In this regard, in some such embodiments a user may utilize an intermediary device connected via an onboard communications network to the onboard vehicle system to control one or more aspects of the audio data outputted via the onboard vehicle system, such as particular portion of playable audio data being output, a particular timestamp of that audio data at which to output, a volume level, and/or the like. In this regard, while in some embodiments the apparatus 400 outputs the user interfaces depicted and described with respect to the following figures, in other embodiments the apparatus 300 embodying a particular intermediary device outputs such user interfaces.

It will be appreciated that the user interface 1500 includes aa plurality of interface elements corresponding to sets set of playable audio data stored by the apparatus 400. In this regard, the user interface 1500 includes audio set element 1502, audio set element 1504, audio set element 1506, and audio set element 1508. Such interface elements correspond to the similarly named interface elements depicted and described with respect to the user interface 1000 of FIG. 10. Notably, however, the audio set element 1502, audio set element 1504, audio set element 1506, and audio set element 1508 do not include controls for altering or otherwise managing the set of playable audio data. In this regard, the set of playable audio data corresponding to each interface element is unalterable via the onboard vehicle system embodied by the apparatus 400. In some embodiments, a user may provide user input that engages one of the audio set elements to initiate outputting of particular playable audio data from the set of playable audio data corresponding to the engaged interface element. For example, engagement with a particular audio set element 1502, audio set element 1504, audio set element 1506, and/or audio set element 1508 may trigger transition to the user interface 1600 as depicted and described with respect to FIG. 16.

Figure 16:
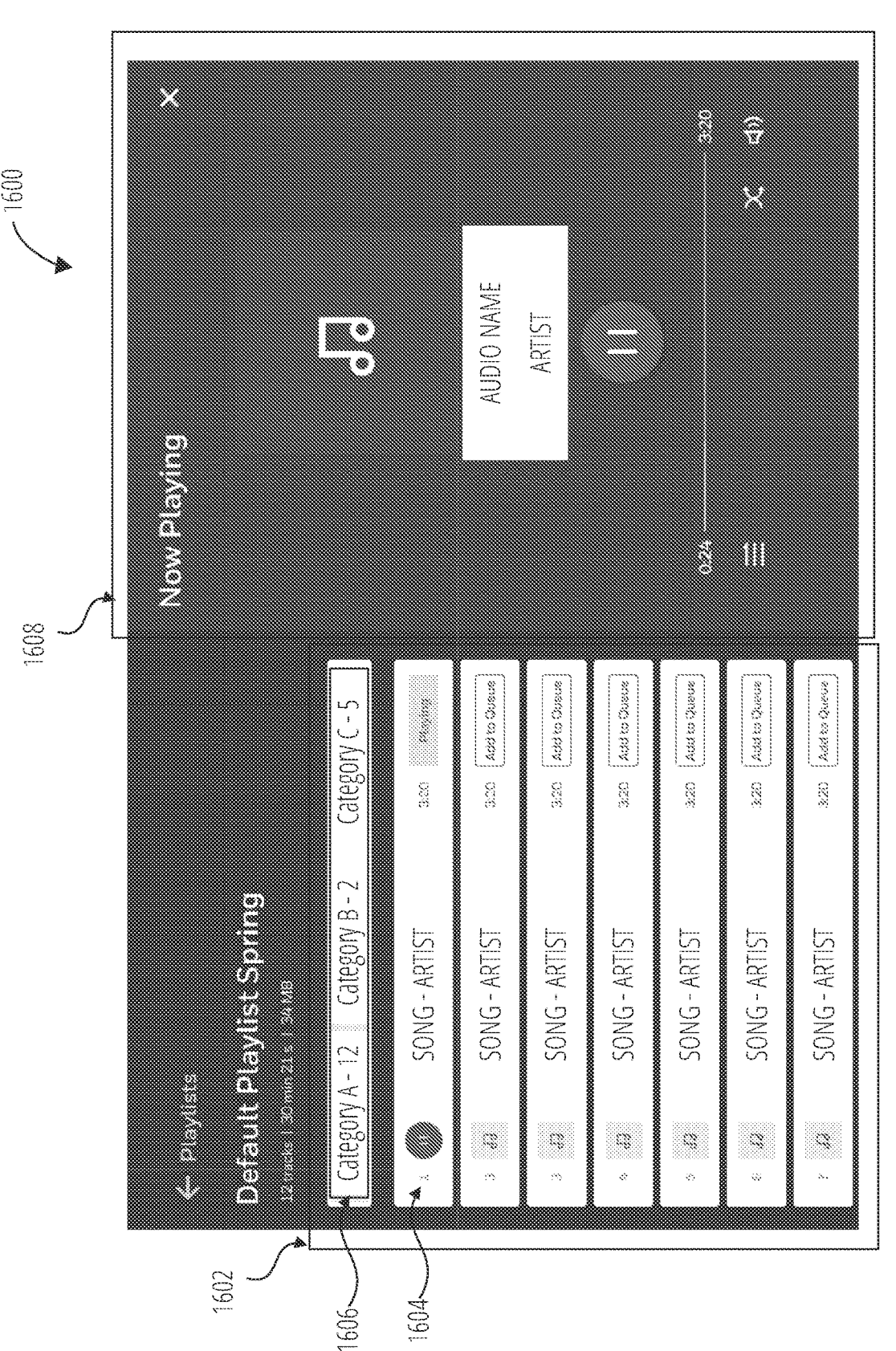
FIG. 16 illustrates an example user interface for managing outputting of particular selected playable audio data via an onboard vehicle system in accordance with at least one example embodiment of the present disclosure.

FIG. 16 illustrates an example user interface for managing outputting of particular selected playable audio data via an onboard vehicle system in accordance with at least one example embodiment of the present disclosure. Specifically, FIG. 16 depicts an example user interface 1600. In some embodiments, the user interface 1600 is rendered via the apparatus 400 embodying an example onboard vehicle system, for example onboard vehicle system 110*a*.

The user interface 1600 includes interface elements for triggering outputting of, and managing outputting of, particular selected playable audio data of a particular set of playable audio data. As depicted, the user interface 1600 includes a plurality of sub-interfaces, specifically at least audio selection interface 1602 and selected audio management interface 1608. In some embodiments the user interface 1600 includes any number of other sub-interfaces and/or interface elements, for example at least an interface element for returning to the user interface 1500 as depicted and described herein to initiate outputting of a different set of playable audio data.

The audio selection interface 1602 includes any number of sub-elements, each corresponding to a particular portion of playable audio data in a selected set of playable audio data. In some embodiments, each interface element is configured to receive user input that selects a portion of playable audio data corresponding to the particular engaged interface element to trigger outputting of that selected playable audio data. For example, as depicted, the audio selection interface 1602 includes selected playable audio data element 1604. The selected playable audio data element 1604 corresponds to a currently selected playable audio data, which is currently being outputted via the onboard vehicle system embodied by the apparatus 400.

In some embodiments, the audio selection interface 1602 further includes any number of type filter elements 1606. The type filter elements 1606 may each be utilized to cause rendering specifically of interface elements only corresponding to portions of playable audio data in the selected set of playable audio data that are of a particular audio data type. For example, a user may interact with one of the type filter elements 1606 to filter the selected playable audio data element audio selection interface 1602 to depict only portions of audio data that are of a music audio type, a different element to filter the audio selection interface 1602 to depict only portions of audio data that are of an announcement data type, and/or the like. Upon selection of a particular portion of playable audio data via the audio selection interface 1602, the apparatus 400 may receive that user input representing a selected playable audio data, and begin outputting of the selected playable audio data via one or more audio outputs similarly onboard the vehicle together with the apparatus 400. For example, the apparatus 400 may be directly coupled with one or more of such audio outputs, and transmit audio signals em of the selected playable audio data to the one or more audio outputs.

The user interface 1600 further includes a selected audio management interface 1608. The selected audio management interface 1608 may include any number of interface elements that enable adjustment of the parameters associated with outputting a selected playable audio data or subsequently selected playable audio data. For example, in some embodiments, the selected audio management interface 1608 depicts the selected playable audio data currently being outputted. Additionally or alternatively, in some embodiments, the selected audio management interface 1608 includes at least one interface element that enables pausing and/or resuming of outputting of the currently selected playable audio data. Additionally or alternatively, in some embodiments, the selected audio management interface 1608 includes at least one interface element that enables skipping of the currently selected playable audio data. Additionally or alternatively, in some embodiments, the selected audio management interface 1608 includes at least one interface element that enables adjustment of a volume of the selected playable audio data currently being outputted via one or more audio outputs. Additionally or alternatively, in some embodiments, the selected audio management interface 1608 includes at least one interface element that enables seeking through different portions of the currently selected playable audio data, for example to a particular timestamp of the audio file. It will be appreciated that any of a myriad of other audio management interface elements may similarly be included in the selected audio management interface 1608 as known in the art.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, at an intermediary device, from an authorized control device, a set of audio data controlled by the authorized control device,
wherein the set of audio data is received based at least in part on at least one retrieval parameter;
transmitting the set of audio data from the intermediary device to an onboard vehicle system via at least one wireless communications network; and
storing the set of audio data on the onboard vehicle system,
wherein the set of audio data stored on the onboard vehicle system is not able to be adjusted by users of the onboard vehicle system or the intermediary device, and
wherein the onboard vehicle system is configured to output at least one audio data of the set of audio data via at least one audio output directly coupled to the onboard vehicle system.

2. The computer-implemented method of claim 1, further comprising:
causing rendering of a user interface comprising at least one interface element configured to control output of a selected audio data via the onboard vehicle system.

3. The computer-implemented method of claim 1, further comprising:
authenticating user credentials, wherein the set of audio data is retrieved based on data corresponding to the user credentials.

4. The computer-implemented method of claim 1, further comprising:
causing rendering of a user interface comprising at least one indication of at least one available set, the at least one available set comprising the set of audio data;
receiving user input engaging a particular indication corresponding to the set of audio data; and
in response to the user input, transmitting a request to the authorized control device, the request comprising a requested parameter corresponding to the particular indication, the requested parameter comprising the at least one retrieval parameter associated with the set of audio data.

5. The computer-implemented method of claim 1, further comprising:
detecting a connection to the onboard vehicle system, wherein the set of audio data is transmitted to the onboard vehicle system in response to detection of the connection.

6. The computer-implemented method of claim 1, further comprising:
receiving a notification that an update to the set of audio data controlled by the authorized control device is available,
wherein the retrieving of the set of audio data occurs automatically in response to the notification.

7. The computer-implemented method of claim 1, further comprising:
receiving a notification that an update to the set of audio data controlled by the authorized control device is available; and
causing rendering of an alert via a user interface, wherein the alert indicates that the update to the set of audio data is available via the authorized control device.

8. The computer-implemented method of claim 1, wherein the set of audio data comprises an updated set of audio data corresponding to a previously-stored set of audio data, and wherein the computer-implemented method further comprises:

updating storage of the previously-stored set of audio data based on the updated audio data.

9. An apparatus comprising at least one processor and at least one non-transitory memory having computer-coded instructions stored thereon that, in execution with the at least one processor, is configured to:

receive, at an intermediary device, from an authorized control device, a set of audio data controlled by the authorized control device, wherein the set of audio data is received based at least in part on at least one retrieval parameter; and transmit the set of audio data from the intermediary device to at least one onboard vehicle system via at least one wireless communications network; and storing, on the onboard vehicle system, the set of audio data, wherein the set of audio data stored on the onboard vehicle system is not able to be adjusted by users of the onboard vehicle system or the intermediary device, and wherein the onboard vehicle system is configured to output at least one audio data of the set of audio data via at least one audio output directly coupled to the onboard vehicle system.

10. The apparatus of claim 9, further configured to:

cause rendering of a user interface comprising at least one interface element configured to control output of a selected audio data via the onboard vehicle system.

11. The apparatus of claim 9, further configured to:

authenticate user credentials, wherein the set of audio data is retrieved based on data corresponding to the user credentials.

12. The apparatus of claim 9, further configured to:

cause rendering of a user interface comprising at least one indication of at least one available playable set, the at least one available set comprising the set of audio data;

receive user input engaging a particular indication corresponding to the set of audio data; and in response to the user input, transmit a request to the authorized control device, the request comprising a requested parameter corresponding to the particular indication, the requested parameter comprising the at least one retrieval parameter associated with the set of audio data.

13. The apparatus of claim 9, further configured to:

detect a connection to the onboard vehicle system, wherein the set of audio data is transmitted to the onboard vehicle system in response to detection of the connection.

14. The apparatus of claim 9, further configured to:

receive a notification that an update to the set of audio data controlled by the authorized control device is available, wherein the retrieving of the set of audio data occurs automatically in response to the notification.

15. The apparatus of claim 9, further configured to:

receive a notification that an update to the set of audio data controlled by the authorized control device is available; and cause rendering of an alert via a user interface, wherein the alert indicates that the update to the set of audio data is available via the authorized control device.

16. The apparatus of claim 9, wherein the set of audio data comprises an updated set of audio data corresponding to a previously-stored set of audio data, and the apparatus further configured to:

update storage of the previously-stored set of audio data based on the updated audio data.

17. A computer program product comprising at least one non-transitory computer-readable storage medium having computer program code stored thereon that, in execution with at least one processor, configures the computer program product for:

receiving, at an intermediary device, from an authorized control device, a set of audio data controlled by the authorized control device, wherein the set of audio data is received based at least in part on at least one retrieval parameter;

transmitting the set of audio data at an intermediary device, to at least one onboard vehicle system via at least one wireless communications network; and storing, on the onboard vehicle system, the set of audio data, wherein the set of audio data stored on the onboard vehicle system is not able to be adjusted by users of the onboard vehicle system or the intermediary device, wherein the onboard vehicle system is configured to output at least one audio data of the set of audio data via at least one audio output directly coupled to the onboard vehicle system via a wired communications network.

18. The computer program product of claim 17, further configured for:

causing rendering of a user interface comprising at least one interface element configured to control output of a selected audio data via the onboard vehicle system.

19. The computer program product of claim 17, further configured for:

causing rendering of a user interface comprising at least one indication of at least one available set, the at least one available set comprising the set of audio data;

receiving user input engaging a particular indication corresponding to the set of audio data; and in response to the user input, transmitting a request to the authorized control device, the request comprising a requested parameter corresponding to the particular indication, the requested parameter comprising the at least one retrieval parameter associated with the set of audio data.

20. The computer program product of claim 17, further configured for:

receiving a notification that an update to the set of audio data controlled by the authorized control device is available; and causing rendering of an alert via a user interface, wherein the alert indicates that the update to the set of audio data is available via the authorized control device.

* * * * *